US010808963B2

(12) United States Patent
Spors et al.

(10) Patent No.: US 10,808,963 B2
(45) Date of Patent: Oct. 20, 2020

(54) ELECTRONIC DEVICES WITH MODULAR HOUSINGS

(71) Applicant: Johnson Controls Technology Company, Auburn Hills, MI (US)

(72) Inventors: Daniel J. Spors, West Bend, WI (US); Daniel R. Hjortland, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/246,387

(22) Filed: Jan. 11, 2019

(65) Prior Publication Data

US 2020/0224922 A1 Jul. 16, 2020

(51) Int. Cl.
*F24F 13/20* (2006.01)
*G01K 1/08* (2006.01)
*F24F 11/88* (2018.01)
*F24F 11/523* (2018.01)
*F24F 11/89* (2018.01)

(52) U.S. Cl.
CPC ............ *F24F 13/20* (2013.01); *F24F 11/523* (2018.01); *F24F 11/88* (2018.01); *F24F 11/89* (2018.01); *G01K 1/08* (2013.01); *F24F 2013/207* (2013.01); *G01K 2201/00* (2013.01)

(58) Field of Classification Search
CPC .. F24F 13/20; F24F 11/88; F24F 11/89; F24F 11/523; F24F 2013/207; G01K 1/08; G01K 2201/00
See application file for complete search history.

(56) References Cited

U.S. PATENT DOCUMENTS

| 7,607,251 | B2 * | 10/2009 | Kim ...................... F24F 1/0007 40/725 |
| D828,816 | S | 9/2018 | Spors et al. |
| 10,359,790 | B2 * | 7/2019 | Novotny .............. H05K 5/0004 |
| 2009/0193724 | A1 * | 8/2009 | Struthers .................. H02G 3/00 52/27 |
| 2010/0101854 | A1 * | 4/2010 | Wallaert ................... F24F 11/00 174/502 |
| 2010/0106305 | A1 * | 4/2010 | Pavlak ............... G05D 23/1902 700/276 |
| 2011/0075065 | A1 * | 3/2011 | Ozolins ................. G02F 1/1333 349/58 |
| 2013/0099009 | A1 * | 4/2013 | Filson ................ G05D 23/1902 236/1 C |
| 2015/0276238 | A1 * | 10/2015 | Matsuoka .............. G05B 15/02 700/278 |

(Continued)

FOREIGN PATENT DOCUMENTS

WO   WO 2018/156137   8/2018

*Primary Examiner* — Abhishek M Rathod
(74) *Attorney, Agent, or Firm* — Foley & Lardner LLP

(57) ABSTRACT

A sensor device including a housing and a number of sensors. The housing includes a back plate including a mounting surface, a middle plate attached to the back plate, and a face plate attached to the middle plate, wherein the face plate is formed from a clear material and has a back surface and a front surface with the back surface positioned toward the middle plate and wherein a design is applied to the back surface of the face plate and is visible through the front surface of the face plate. The housing defines an interior housing volume and the number of sensors is positioned within the interior housing volume.

4 Claims, 23 Drawing Sheets

(56) References Cited

U.S. PATENT DOCUMENTS

2017/0146260 A1* 5/2017 Ribbich .............. G05B 19/048
2018/0058713 A1* 3/2018 Spors ..................... F24F 11/89
2018/0058941 A1   3/2018 Spors

* cited by examiner

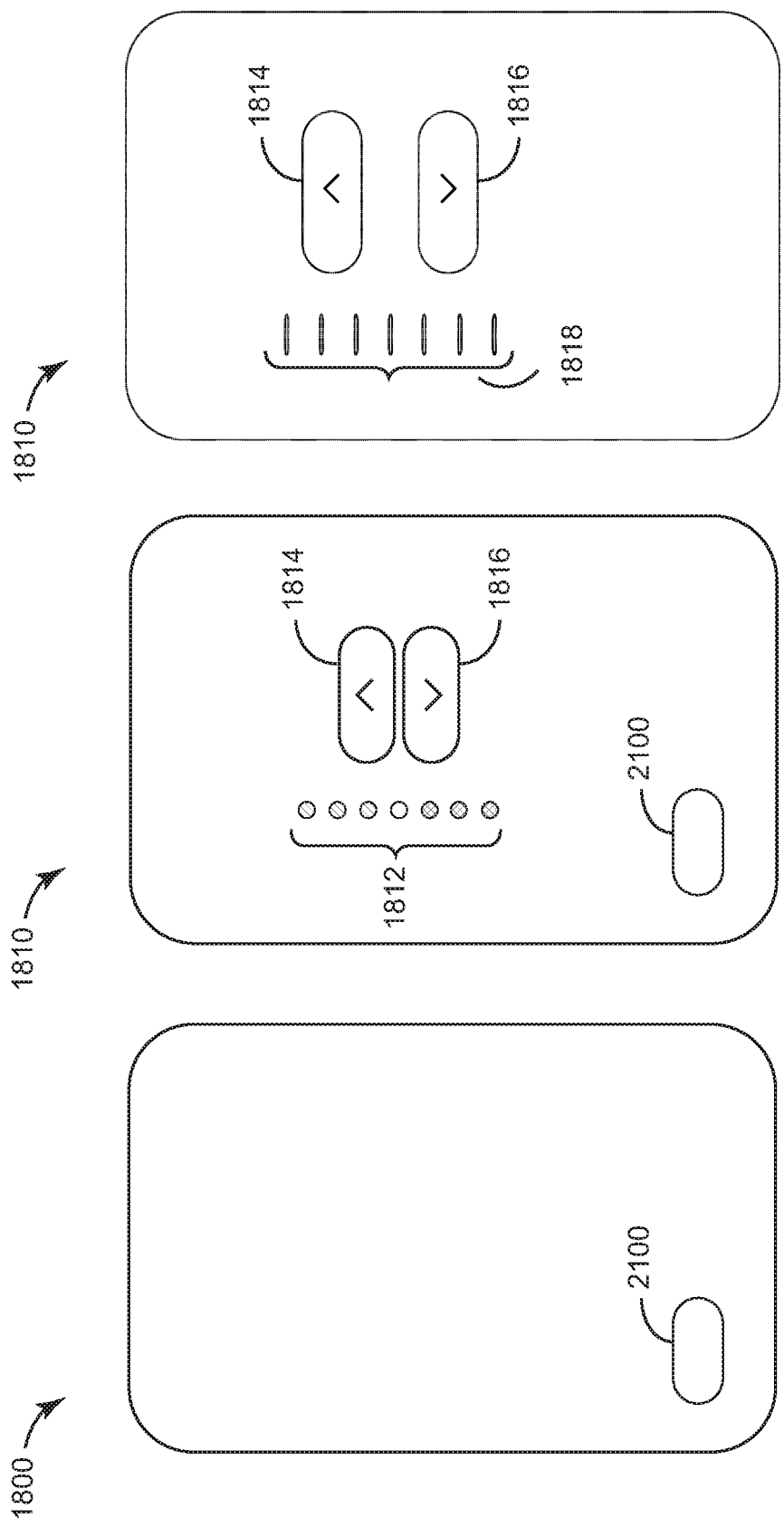

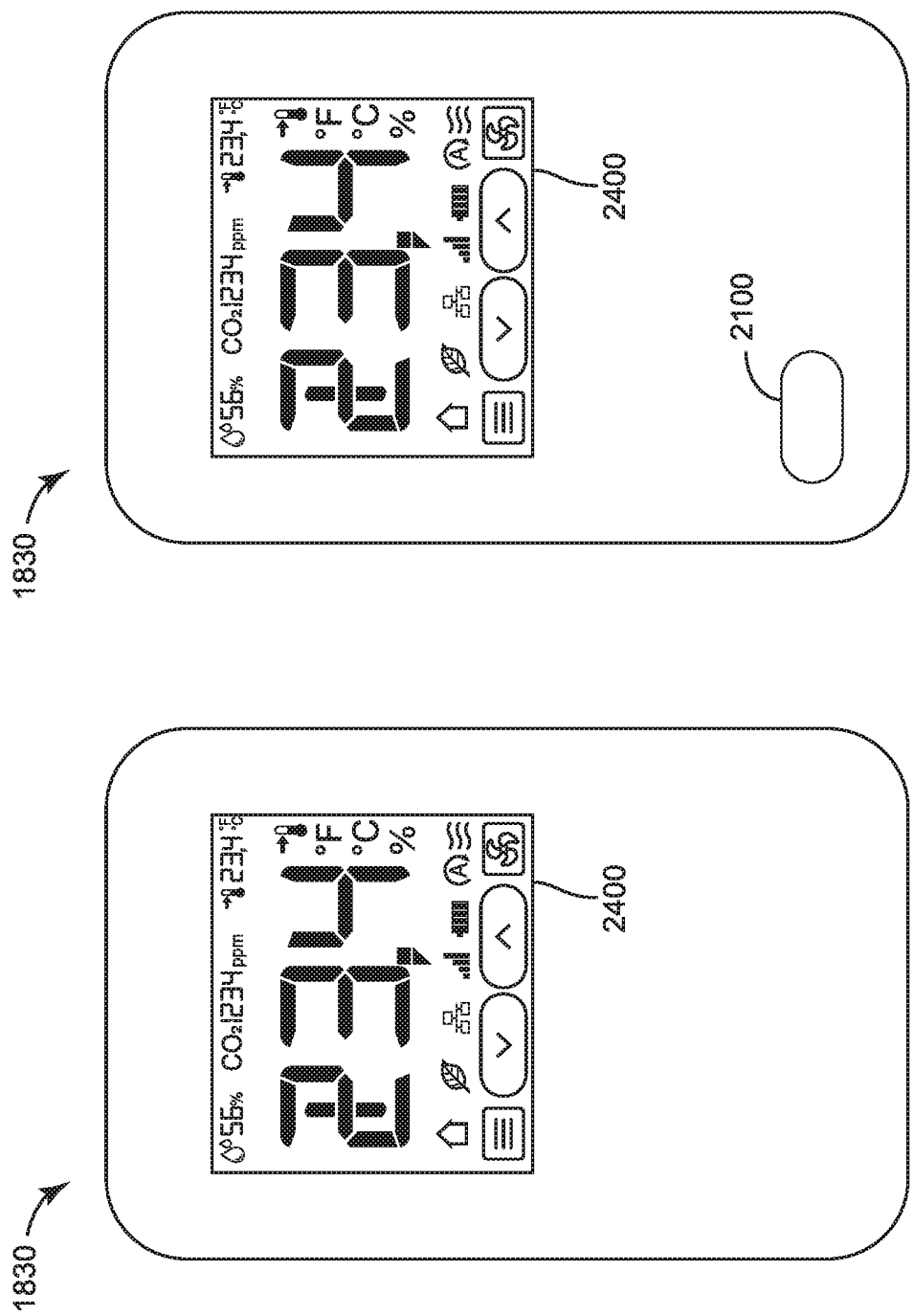

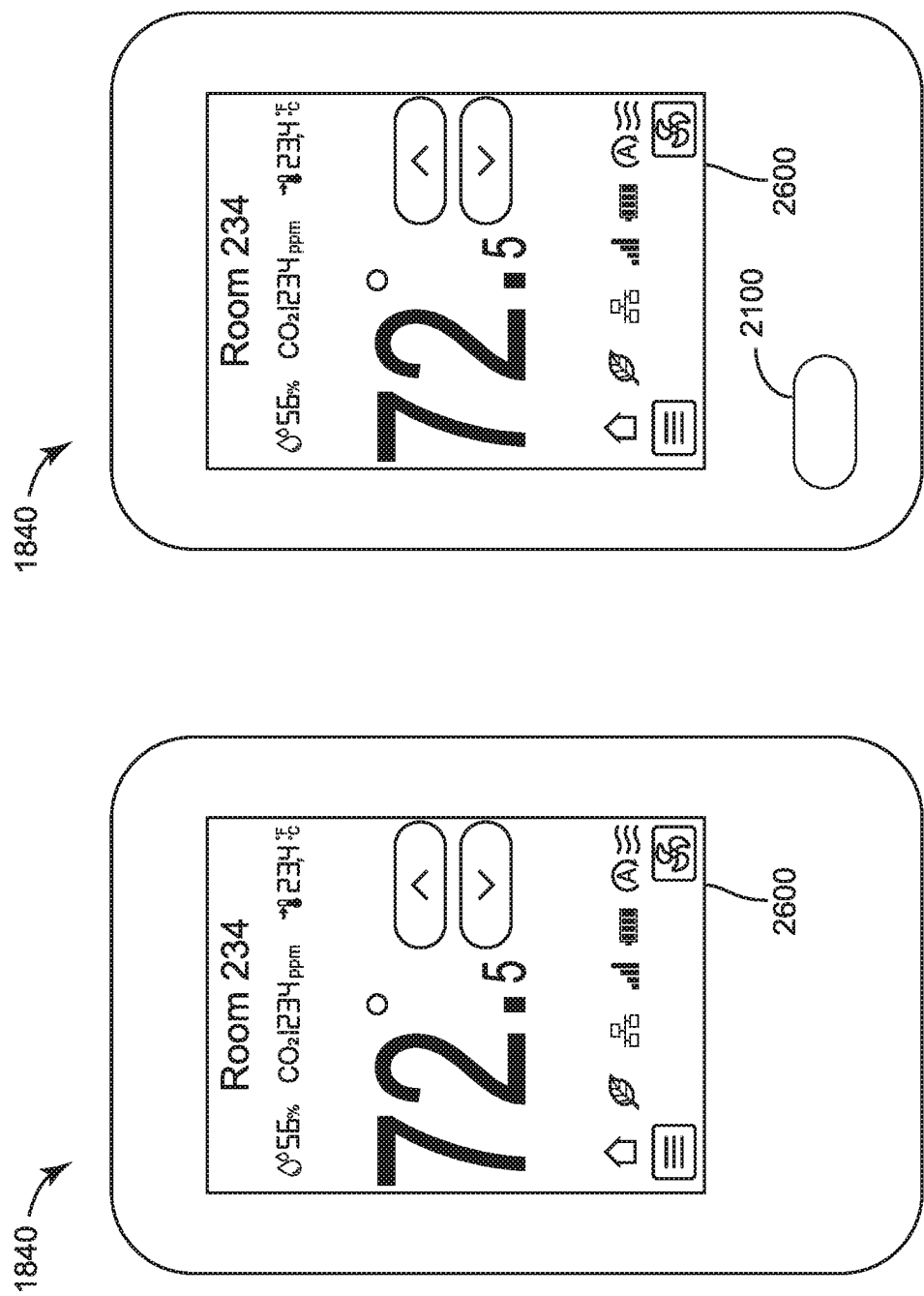

ELECTRONIC DEVICES WITH MODULAR HOUSINGS

BACKGROUND

The present application relates generally to the fields of electronic HVAC devices and accessories for electronic HVAC devices. The present application relates more specifically to a modular housing of an electronic device configured to encapsulate the device with a low profile and to allow ornamental customization of the appearance of the device.

As electronic HVAC equipment becomes smaller, faster, and more feature-laden, housings for electronic HVAC equipment must accommodate a larger number of components in a smaller amount of space. Due to customization, device housings must fit a range of component configurations as well as provide a range of device appearances. Conventionally, different configurations and appearances each require disparate device housings. Designing and manufacturing a disparate device housing for every combination of configuration and appearance is wasteful of time and materials. Accordingly, there is a need for a housing for an HVAC sensor device or thermostat that is configured to easily adapt to different device form factors and ornamental appearances.

SUMMARY

One implementation of the present disclosure includes a sensor device including a housing and multiple sensors. The housing including a back plate and a front portion. The back plate including a mounting surface and a protrusion extending away from the mounting surface, wherein the mounting surface is configured to attach to a standard size electrical junction box and the protrusion is sized to fit within a standard size electrical junction box, and wherein the protrusion defines an interior protrusion volume. The front portion configured to attach to the back plate and define an interior housing volume. The number of sensors positioned within the interior housing volume, wherein at least one of the sensors extends from the interior housing volume into the interior protrusion volume.

In some embodiments, the front portion of the housing includes a bezel configured to attach to the back plate and a face plate configured to attach to the bezel. In some embodiments, the multiple sensors include a temperature sensor, an occupancy sensor, a humidity sensor, and a carbon dioxide sensor. In some embodiments, the carbon dioxide sensor extends from the interior housing volume into the interior protrusion volume. In some embodiments, the protrusion includes a back wall spaced apart from the mounting surface and four sidewalls connecting the back wall to the mounting surface.

In some embodiments, the back plate further includes a top wall, a ledge positioned below the top wall, the ledge including an exterior surface, and an air inlet formed between the top wall and the ledge. The exterior surface of the ledge is positioned at an exterior angle less than 90° relative to the exterior surface of the rear wall. In some embodiments, the ledge includes a projection area defined by a horizontal distance between an edge of the top wall and the exterior surface of the rear wall.

Another implementation of the present disclosure includes an electronic device. The electronic device includes a housing and a number of electronic components. The housing includes a back plate and a front portion configured to attach to the back plate and define an interior housing volume. The back plate including a mounting surface and a protrusion extending away from the mounting surface, wherein the mounting surface is configured to attach to a standard size electrical junction box and the protrusion is sized to fit within a standard size electrical junction box, and wherein the protrusion defines an interior protrusion volume. The number of electronic components is positioned within the interior housing volume, wherein at least one of the electronic components extends from the interior housing volume into the interior protrusion volume.

In some embodiments, the number of electronic components includes a circuit board and multiple sensors. In some embodiments, the front portion of the housing includes a bezel configured to attach to the back plate and a face plate configured to attach to the bezel. In some embodiments, the number of electronic components includes a temperature sensor, an occupancy sensor, a humidity sensor, and a carbon dioxide sensor. In some embodiments, the carbon dioxide sensor extends from the interior housing volume into the interior protrusion volume. In some embodiments, the protrusion includes a back wall spaced apart from the mounting surface and four sidewalls connecting the back wall to the mounting surface.

Another implementation of the present disclosure includes a method of manufacturing a number of sensor devices. The method includes selecting one or more sensor components, selecting a back plate from a number of back plates, wherein the number of back plates include a standard depth and a low profile depth, and wherein each in the number of back plates are molded around the one or more sensor components. The method further includes selecting a bezel from a number of bezels having different ornamentations, selecting a face plate from a number of face plates, and assembling a first sensor device wherein the first sensor device includes the back plate, the bezel, and the face plate.

Another implementation of the present disclosure includes a sensor device including a housing and a number of sensors. The housing includes a back plate including a mounting surface, a middle plate attached to the back plate, and a face plate attached to the middle plate, wherein the face plate is formed from a clear material and has a back surface and a front surface with the back surface positioned toward the middle plate and wherein a design is applied to the back surface of the face plate and is visible through the front surface of the face plate. The housing defines an interior housing volume and the number of sensors is positioned within the interior housing volume.

Another implementation of the present disclosure includes an electronic device including a housing and a number of sensors. The housing includes a back plate including a mounting surface, a middle plate attached to the back plate, and a face plate attached to the middle plate, wherein the face plate is formed from a clear material and has a back surface and a front surface with the back surface positioned toward the middle plate and wherein a design is applied to the back surface of the face plate and is visible through the front surface of the face plate. The housing defines an interior housing volume and the number of sensors is positioned within the interior housing volume.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 21 is the display of FIG. 18 including an opening, according to an example embodiment.

FIG. 22 is the display of FIG. 19 including an opening, according to an example embodiment.

FIG. 22A is the display of FIG. 19 including rectangular indicator lights, according to an example embodiment.

FIG. 24 is the display of FIG. 18 including a first display element, according to an example embodiment.

FIG. 25 is the display of FIG. 24 including an opening, according to an example embodiment.

FIG. 26 is the display of FIG. 18 including a second display element, according to an example embodiment.

FIG. 27 is the display of FIG. 26 including an opening, according to an example embodiment.

DETAILED DESCRIPTION

Referring generally to the FIGURES, a modular housing for an electronic device is shown, according to exemplary embodiments. The modular housing described herein may be used with an electronic device (e.g., a thermostat or a sensor) in an HVAC system, building management system (BMS), or any other system configured to control the environmental conditions of a building. In some embodiments, the electronic device is a building automation device. Building automation devices include, but are not limited to, thermostats, sensors, lighting controls, building controls, and heating, ventilation, air-conditioning, and refrigeration equipment controls.

In some instances, these electronic devices are of different sizes or form factors. For example, an electronic device including a $CO_2$ sensor may be larger than an electronic device without a $CO_2$ sensor. One common technique to account for differences in device size is to redesign a device enclosure to accommodate each different device. Redesigning a device enclosure is costly and could require new manufacturing processes to be developed such as retooling an injection molding process. In other instances, swappable or customizable device appearances may be desirable. For example, a user may desire a specific device color or material. Although replacing a device or a device housing may modify an ornamental appearance, replacing an entire device or device housing is resource inefficient.

Building HVAC Systems and Building Management Systems

Figure 1:
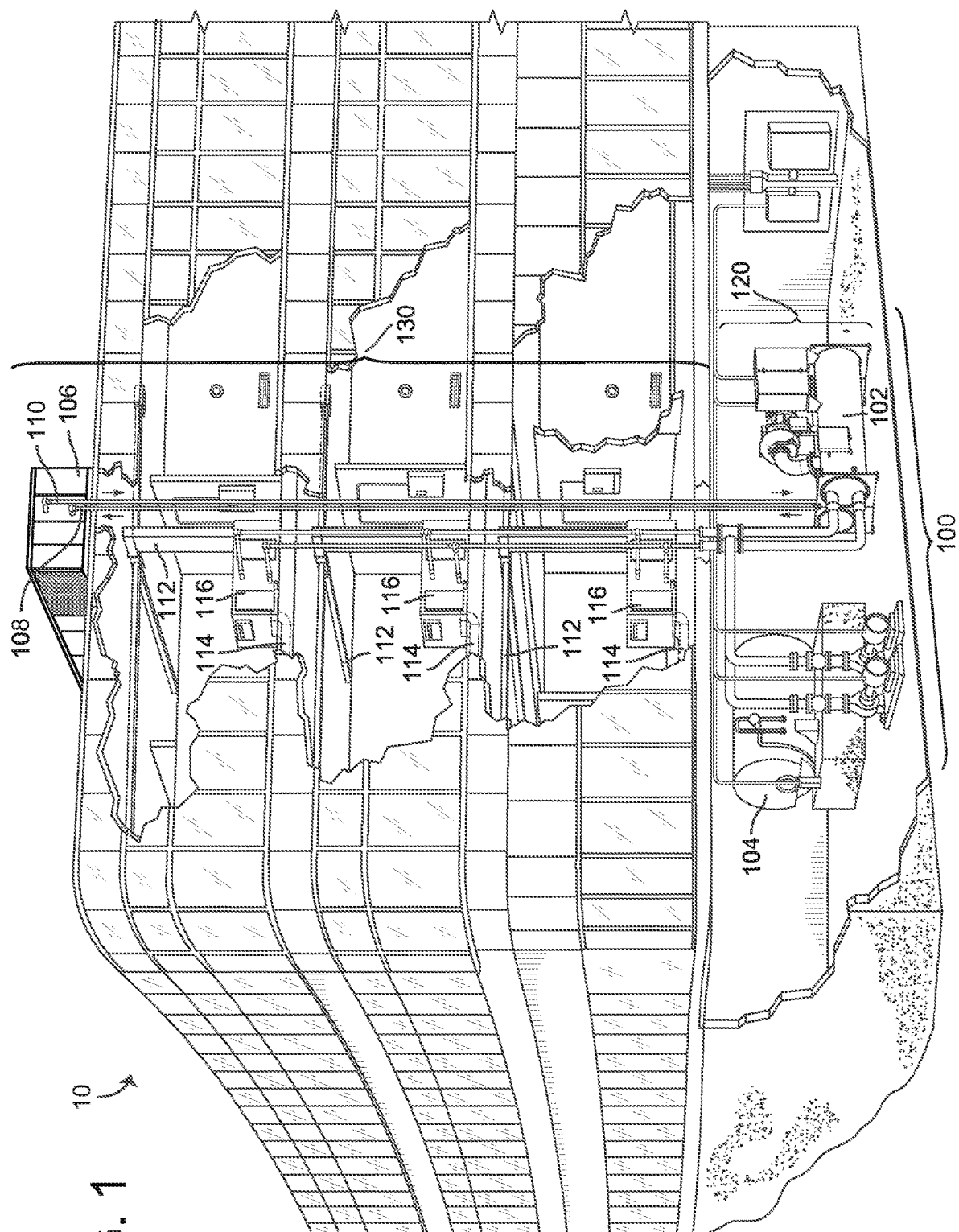
FIG. 1 is a drawing of a building equipped with an HVAC system, according to an exemplary embodiment.
Figure 2:
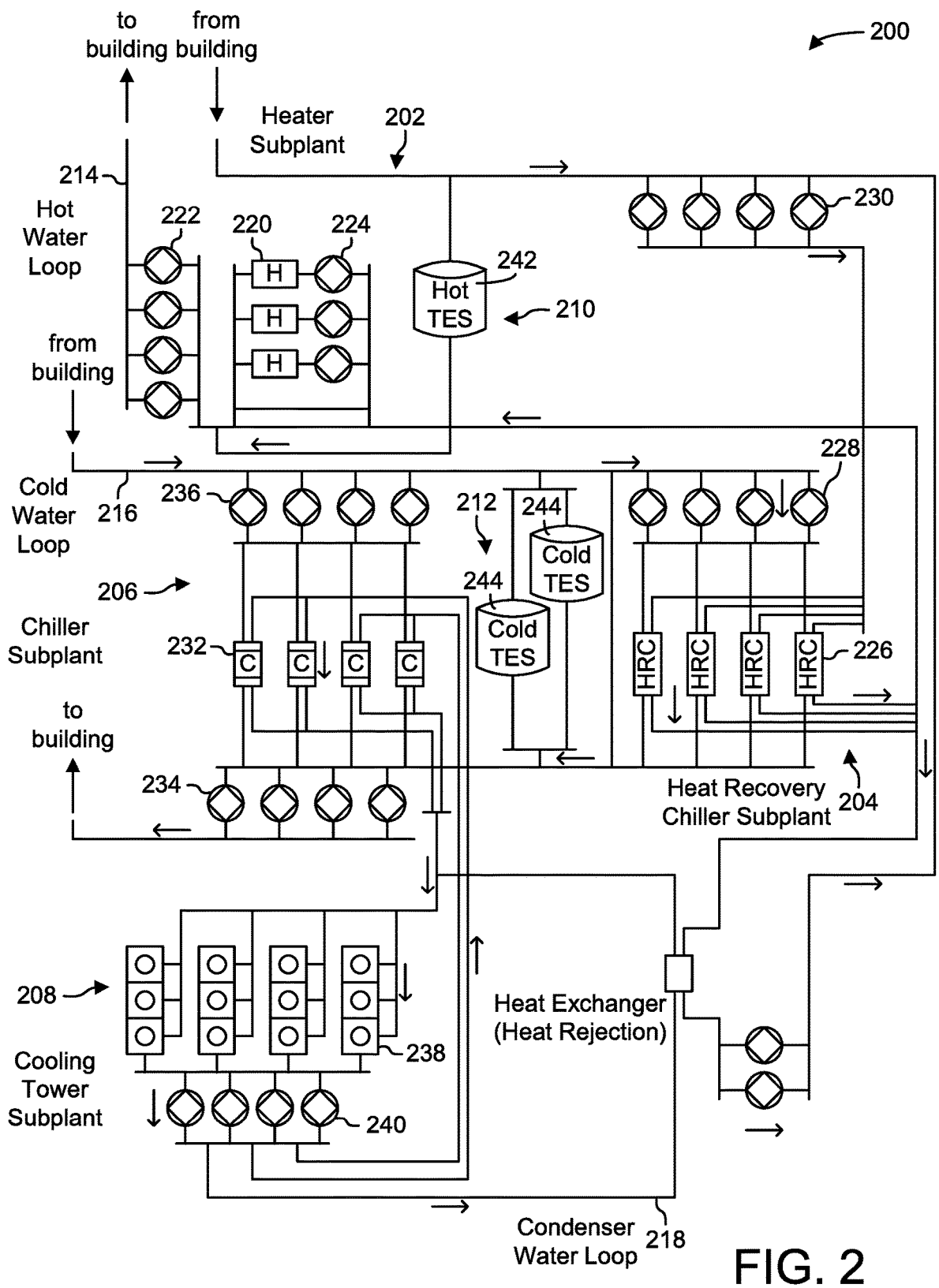
FIG. 2 is a block diagram of a waterside system that may be used in conjunction with the building of FIG. 1, according to an exemplary embodiment.
Figure 3:
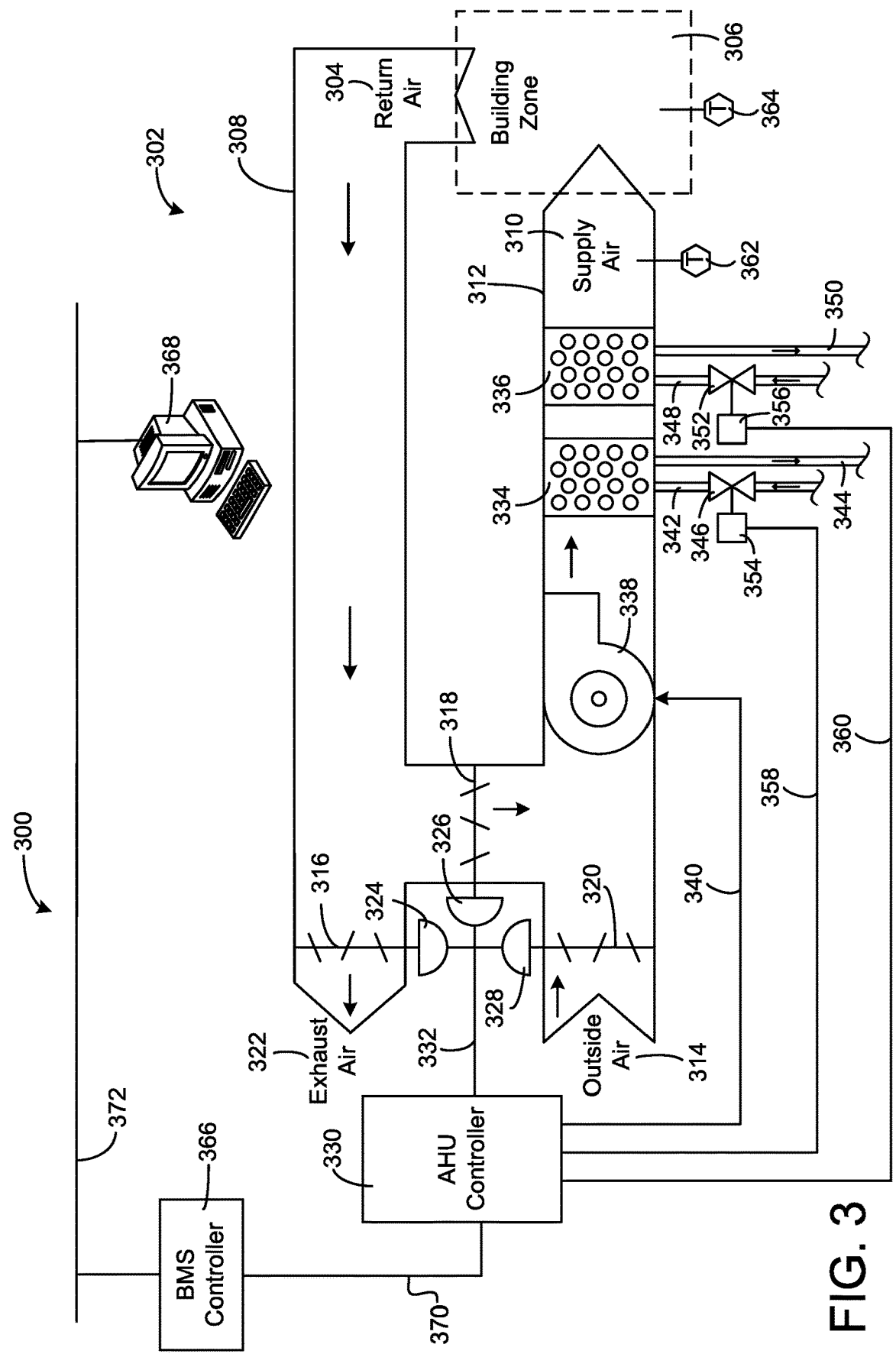
FIG. 3 is a block diagram of an airside system that may be used in conjunction with the building of FIG. 1, according to an exemplary embodiment.
Figure 4:
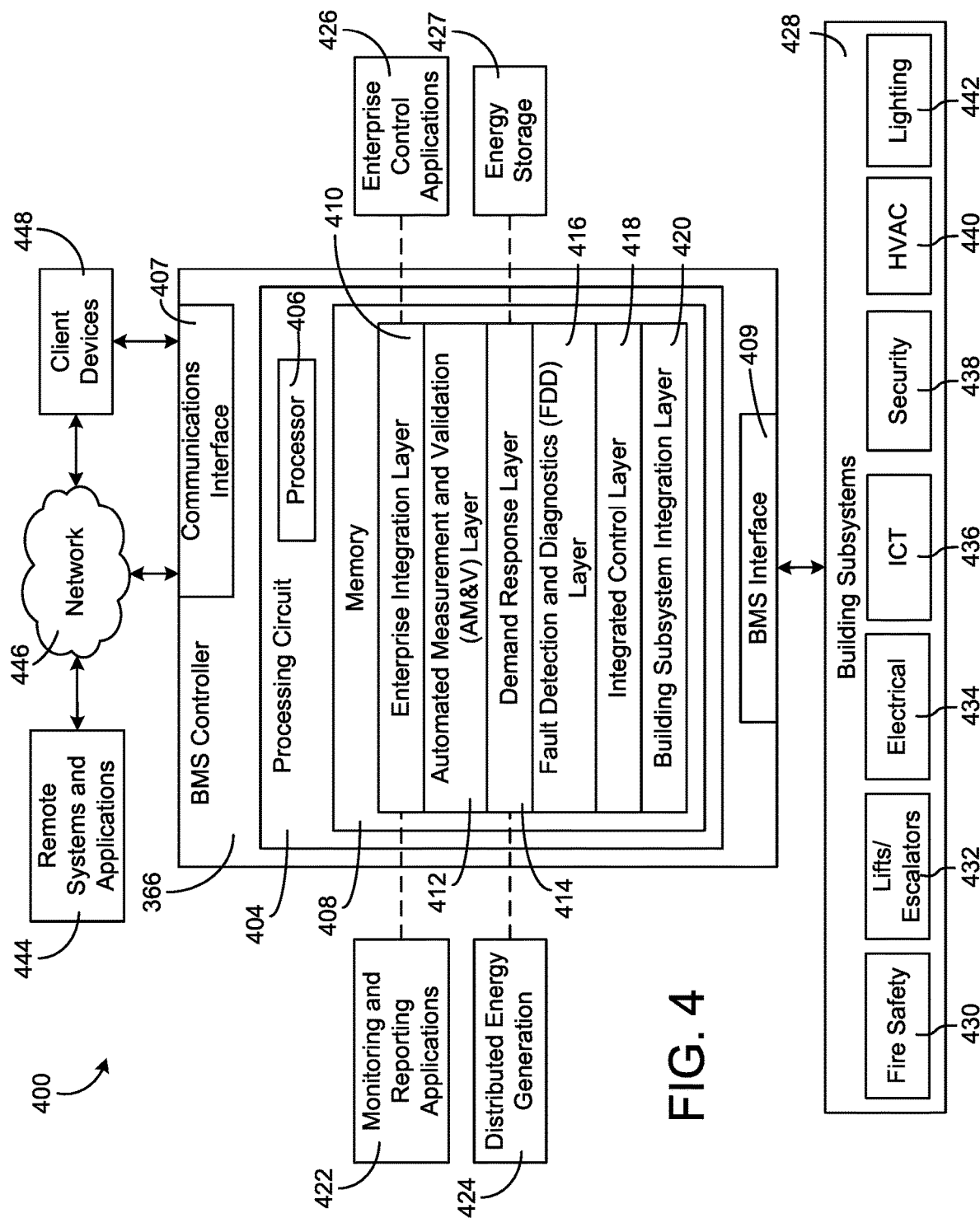
FIG. 4 is a block diagram of a BMS system that may be used to control the HVAC system of FIG. 1, according to an exemplary embodiment.

Referring now to FIGS. 1-4, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Figure 5:
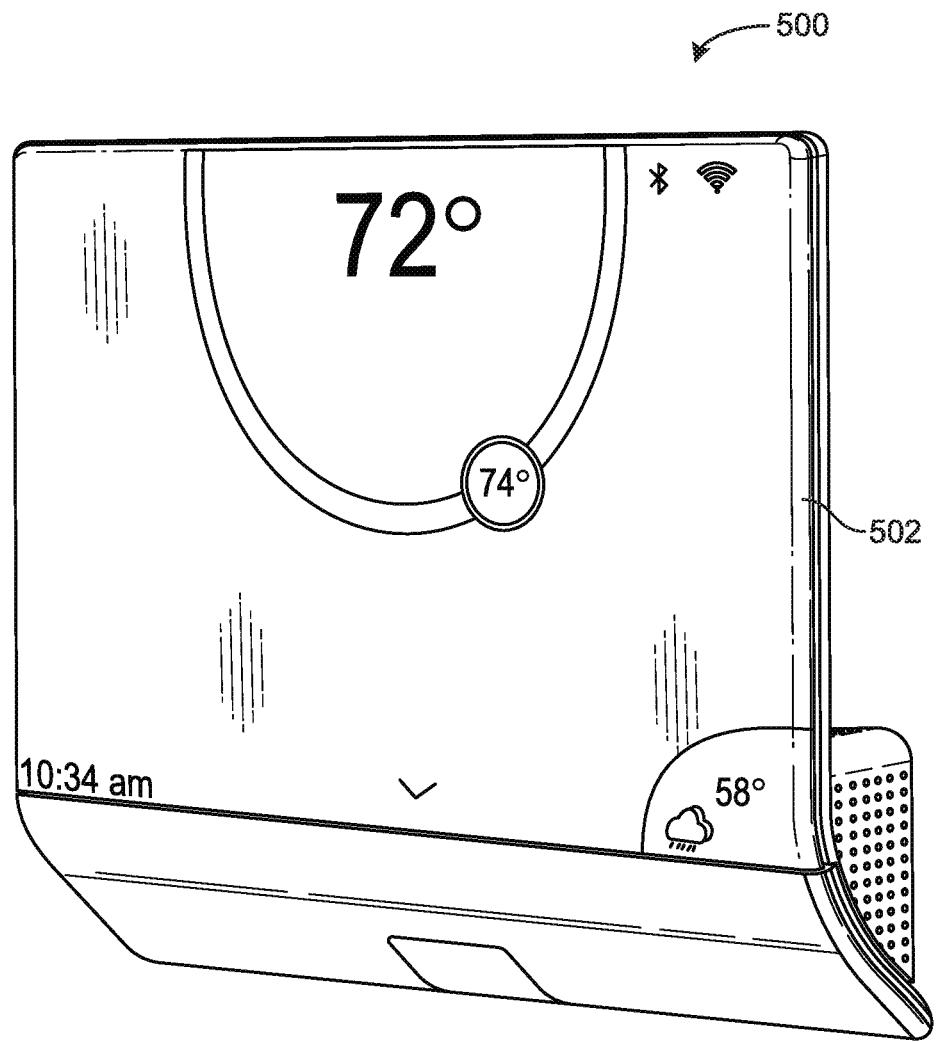
FIG. 5 is a drawing of a cantilevered thermostat with a transparent display that may be used to control the HVAC system of FIG. 1, according to an exemplary embodiment.

Referring now to FIG. 5, a drawing of a thermostat 500 for controlling building equipment is shown, according to an exemplary embodiment. The thermostat 500 is shown to include a display 502. The display 502 may be an interactive display that can display information to a user and receive input from the user. The display may be transparent such that a user can view information on the display and view the surface located behind the display. Thermostats with transparent and cantilevered displays are described in further detail in U.S. patent application Ser. No. 15/146,649 filed May 4, 2016, the entirety of which is incorporated by reference herein.

The display 502 can be a touchscreen or other type of electronic display configured to present information to a user in a visual format (e.g., as text, graphics, etc.) and receive input from a user (e.g., via a touch-sensitive panel). For example, the display 502 may include a touch-sensitive panel layered on top of an electronic visual display. A user can provide inputs through simple or multi-touch gestures by touching the display 502 with one or more fingers and/or with a stylus or pen. The display 502 can use any of a variety of touch-sensing technologies to receive user inputs, such as capacitive sensing (e.g., surface capacitance, projected capacitance, mutual capacitance, self-capacitance, etc.), resistive sensing, surface acoustic wave, infrared grid, infrared acrylic projection, optical imaging, dispersive signal technology, acoustic pulse recognition, or other touch-sensitive technologies known in the art. Many of these technologies allow for multi-touch responsiveness of display 502 allowing registration of touch in two or even more locations at once. The display may use any of a variety of display technologies such as light emitting diode (LED), organic light-emitting diode (OLED), liquid-crystal display (LCD), organic light-emitting transistor (OLET), surfaceconduction electron-emitter display (SED), field emission display (FED), digital light processing (DLP), liquid crystal on silicon (LCoC), or any other display technologies known in the art. In some embodiments, the display 402 is configured to present visual media (e.g., text, graphics, etc.) without requiring a backlight.

Residential HVAC System

Figure 6:
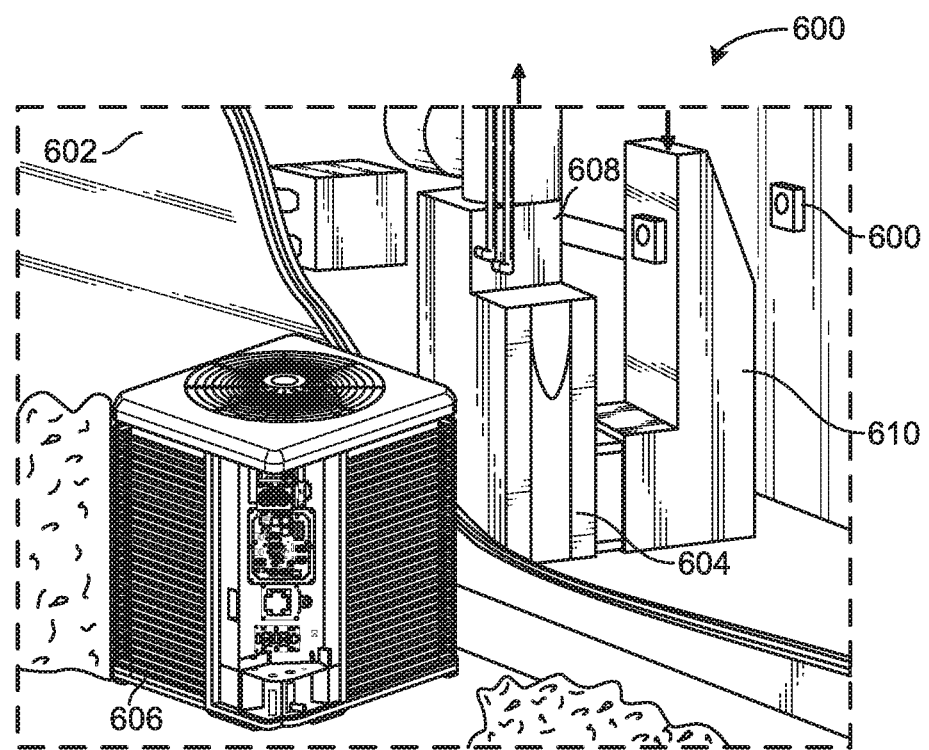
FIG. 6 is a schematic drawing of a building equipped with a residential heating and cooling system and the thermostat of FIG. 5, according to an exemplary embodiment.

Referring now to FIG. 6, a residential heating and cooling system 600 is shown, according to an exemplary embodiment. The residential heating and cooling system 600 may provide heated and cooled air to a residential structure. Although described as a residential heating and cooling system 600, embodiments of the systems and methods described herein can be utilized in a cooling unit or a heating unit in a variety of applications include commercial HVAC units (e.g., roof top units). In general, a residence 602 includes refrigerant conduits that operatively couple an indoor unit 604 to an outdoor unit 606. Indoor unit 604 may be positioned in a utility space, an attic, a basement, and so forth. Outdoor unit 606 is situated adjacent to a side of residence 602. Refrigerant conduits transfer refrigerant between indoor unit 604 and outdoor unit 606, typically transferring primarily liquid refrigerant in one direction and primarily vaporized refrigerant in an opposite direction.

When the system 600 shown in FIG. 6 is operating as an air conditioner, a coil in outdoor unit 606 serves as a condenser for recondensing vaporized refrigerant flowing from indoor unit 604 to outdoor unit 606 via one of the refrigerant conduits. In these applications, a coil of the indoor unit 604, designated by the reference numeral 608, serves as an evaporator coil. Evaporator coil 608 receives liquid refrigerant (which may be expanded by an expansion device, not shown) and evaporates the refrigerant before returning it to outdoor unit 606.

Outdoor unit 606 draws in environmental air through its sides, forces the air through the outer unit coil using a fan, and expels the air. When operating as an air conditioner, the air is heated by the condenser coil within the outdoor unit 606 and exits the top of the unit at a temperature higher than it entered the sides. Air is blown over indoor coil 608 and is then circulated through residence 602 by means of ductwork 610, as indicated by the arrows entering and exiting ductwork 610. The overall system 600 operates to maintain a desired temperature as set by thermostat 500. When the temperature sensed inside the residence 602 is higher than the set point on the thermostat 500 (with the addition of a relatively small tolerance), the air conditioner will become operative to refrigerate additional air for circulation through the residence 602. When the temperature reaches the set point (with the removal of a relatively small tolerance), the unit can stop the refrigeration cycle temporarily.

In some embodiments, the system 600 configured so that the outdoor unit 606 is controlled to achieve a more elegant control over temperature and humidity within the residence 602. The outdoor unit 606 is controlled to operate components within the outdoor unit 606, and the system 600, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

Figure 7:
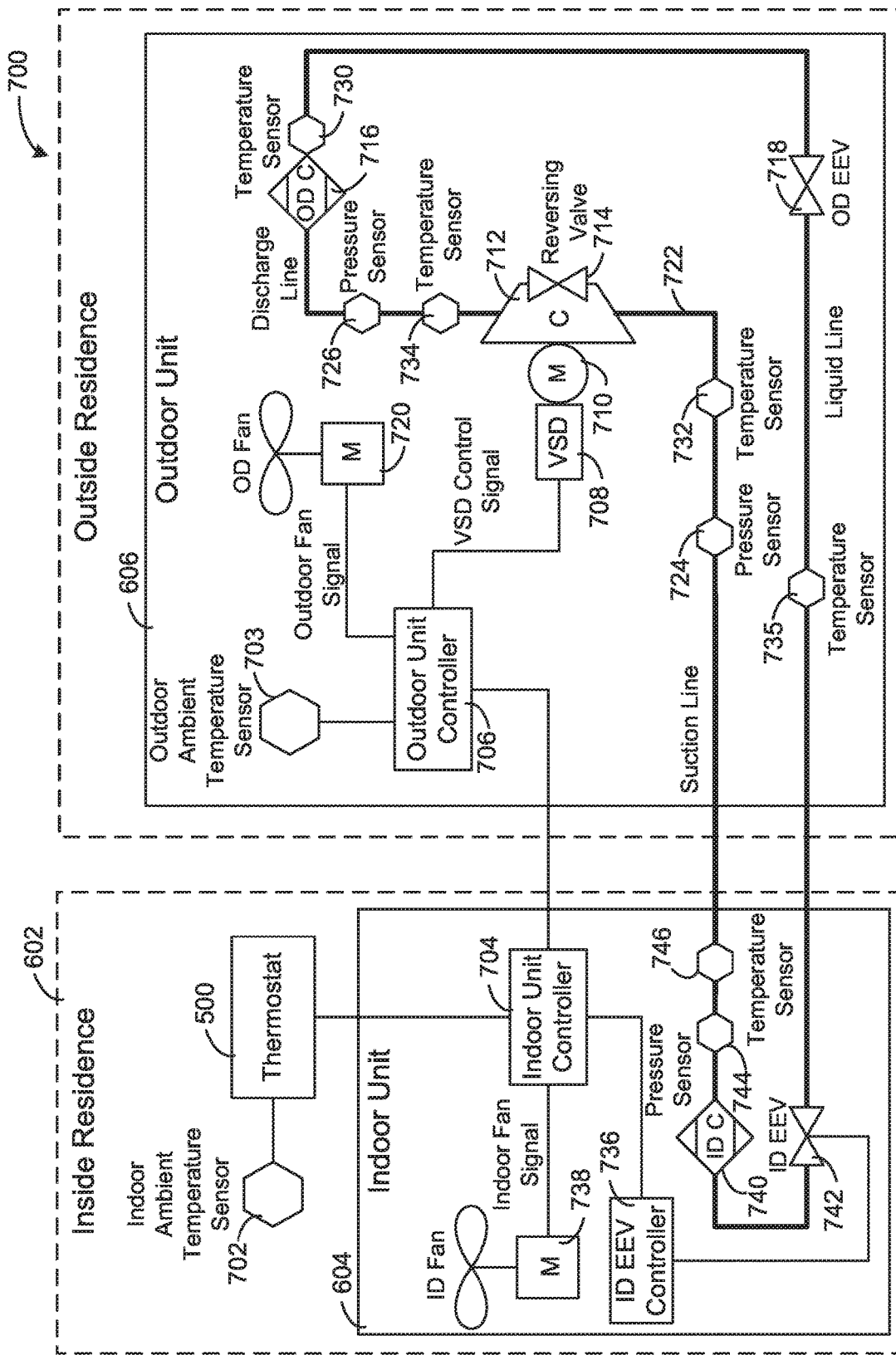
FIG. 7 is a schematic drawing of the thermostat and the residential heating and cooling system of FIG. 6, according to an exemplary embodiment.

Referring now to FIG. 7, an HVAC system 700 is shown according to an exemplary embodiment. Various components of system 700 are located inside residence 602 while other components are located outside residence 602. Outdoor unit 606, as described with reference to FIG. 6, is shown to be located outside residence 602 while indoor unit 604 and thermostat 500, as described with reference to FIG. 6, are shown to be located inside the residence 602. In various embodiments, the thermostat 500 can cause the indoor unit 604 and the outdoor unit 606 to heat residence 602. In some embodiments, the thermostat 500 can cause the indoor unit 604 and the outdoor unit 606 to cool the residence 602. In other embodiments, the thermostat 500 can command an airflow change within the residence 602 to adjust the humidity within the residence 602.

Thermostat 500 can be configured to generate control signals for indoor unit 604 and/or outdoor unit 606. The thermostat 500 is shown to be connected to an indoor ambient temperature sensor 702, and an outdoor unit controller 706 is shown to be connected to an outdoor ambient temperature sensor 703. The indoor ambient temperature sensor 702 and the outdoor ambient temperature sensor 703 may be any kind of temperature sensor (e.g., thermistor, thermocouple, etc.). The thermostat 500 may measure the temperature of residence 602 via the indoor ambient temperature sensor 702. Further, the thermostat 500 can be configured to receive the temperature outside residence 602 via communication with the outdoor unit controller 706. In various embodiments, the thermostat 500 generates control signals for the indoor unit 604 and the outdoor unit 606 based on the indoor ambient temperature (e.g., measured via indoor ambient temperature sensor 702), the outdoor temperature (e.g., measured via the outdoor ambient temperature sensor 703), and/or a temperature set point.

The indoor unit 604 and the outdoor unit 606 may be electrically connected. Further, indoor unit 604 and outdoor unit 606 may be coupled via conduits 722. The outdoor unit 606 can be configured to compress refrigerant inside conduits 722 to either heat or cool the building based on the operating mode of the indoor unit 604 and the outdoor unit 606 (e.g., heat pump operation or air conditioning operation). The refrigerant inside conduits 722 may be any fluid that absorbs and extracts heat. For example, the refrigerant may be hydro fluorocarbon (HFC) based R-410A, R-407C, and/or R-134a.

The outdoor unit 606 is shown to include the outdoor unit controller 706, a variable speed drive 708, a motor 710 and a compressor 712. The outdoor unit 606 can be configured to control the compressor 712 and to further cause the compressor 712 to compress the refrigerant inside conduits 722. In this regard, the compressor 712 may be driven by the variable speed drive 708 and the motor 710. For example, the outdoor unit controller 706 can generate control signals for the variable speed drive 708. The variable speed drive 708 (e.g., an inverter, a variable frequency drive, etc.) may be an AC-AC inverter, a DC-AC inverter, and/or any other type of inverter. The variable speed drive 708 can be configured to vary the torque and/or speed of the motor 710 which in turn drives the speed and/or torque of compressor 712. The compressor 712 may be any suitable compressor such as a screw compressor, a reciprocating compressor, a rotary compressor, a swing link compressor, a scroll compressor, or a turbine compressor, etc.

In some embodiments, the outdoor unit controller 706 is configured to process data received from the thermostat 500 to determine operating values for components of the system 700, such as the compressor 712. In one embodiment, the outdoor unit controller 706 is configured to provide the determined operating values for the compressor 712 to the variable speed drive 708, which controls a speed of the compressor 712. The outdoor unit controller 706 is controlled to operate components within the outdoor unit 606, and the indoor unit 604, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

In some embodiments, the outdoor unit controller 706 can control a reversing valve 714 to operate system 700 as a heat pump or an air conditioner. For example, the outdoor unit controller 706 may cause reversing valve 714 to direct compressed refrigerant to the indoor coil 740 while in heat pump mode and to an outdoor coil 716 while in air conditioner mode. In this regard, the indoor coil 740 and the outdoor coil 716 can both act as condensers and evaporators depending on the operating mode (i.e., heat pump or air conditioner) of system 700.

Further, in various embodiments, outdoor unit controller 706 can be configured to control and/or receive data from an outdoor electronic expansion valve (EEV) 718. The outdoor electronic expansion valve 718 may be an expansion valve controlled by a stepper motor. In this regard, the outdoor unit controller 706 can be configured to generate a step signal (e.g., a PWM signal) for the outdoor electronic expansion valve 718. Based on the step signal, the outdoor electronic expansion valve 718 can be held fully open, fully closed, partial open, etc. In various embodiments, the outdoor unit controller 706 can be configured to generate a step signal for the outdoor electronic expansion valve 718 based on a subcool and/or superheat value calculated from various temperatures and pressures measured in system 700. In one embodiment, the outdoor unit controller 706 is configured to control the position of the outdoor electronic expansion valve 718 based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit controller 706 can be configured to control and/or power outdoor fan 720. The outdoor fan 720 can be configured to blow air over the outdoor coil 716. In this regard, the outdoor unit controller 706 can control the amount of air blowing over the outdoor coil 716 by generating control signals to control the speed and/or torque of outdoor fan 720. In some embodiments, the control signals are pulse wave modulated signals (PWM), analog voltage signals (i.e., varying the amplitude of a DC or AC signal), and/or any other type of signal. In one embodiment, the outdoor unit controller 706 can control an operating value of the outdoor fan 720, such as speed, based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The outdoor unit 606 may include one or more temperature sensors and one or more pressure sensors. The temperature sensors and pressure sensors may be electrical connected (i.e., via wires, via wireless communication, etc.) to the outdoor unit controller 706. In this regard, the outdoor unit controller 706 can be configured to measure and store the temperatures and pressures of the refrigerant at various locations of the conduits 722. The pressure sensors may be any kind of transducer that can be configured to sense the pressure of the refrigerant in the conduits 722. The outdoor unit 606 is shown to include pressure sensor 724. The pressure sensor 724 may measure the pressure of the refrigerant in conduit 722 in the suction line (i.e., a predefined distance from the inlet of compressor 712). Further, the outdoor unit 606 is shown to include pressure sensor 726. The pressure sensor 726 may be configured to measure the pressure of the refrigerant in conduits 722 on the discharge line (e.g., a predefined distance from the outlet of compressor 712).

The temperature sensors of outdoor unit 606 may include thermistors, thermocouples, and/or any other temperature sensing device. The outdoor unit 606 is shown to include temperature sensor 730, temperature sensor 732, temperature sensor 734, and temperature sensor 736. The temperature sensors (i.e., temperature sensor 730, temperature sensor 732, temperature sensor 735, and/or temperature sensor 746) can be configured to measure the temperature of the refrigerant at various locations inside conduits 722.

Referring now to the indoor unit 604, the indoor unit 604 is shown to include indoor unit controller 704, indoor electronic expansion valve controller 736, an indoor fan 738, an indoor coil 740, an indoor electronic expansion valve 742, a pressure sensor 744, and a temperature sensor 746. The indoor unit controller 704 can be configured to generate control signals for indoor electronic expansion valve controller 742. The signals may be set points (e.g., temperature set point, pressure set point, superheat set point, subcool set point, step value set point, etc.). In this regard, indoor electronic expansion valve controller 736 can be configured to generate control signals for indoor electronic expansion valve 742. In various embodiments, indoor electronic expansion valve 742 may be the same type of valve as outdoor electronic expansion valve 718. In this regard, indoor electronic expansion valve controller 736 can be configured to generate a step control signal (e.g., a PWM wave) for controlling the stepper motor of the indoor electronic expansion valve 742. In this regard, indoor electronic expansion valve controller 736 can be configured to fully open, fully close, or partially close the indoor electronic expansion valve 742 based on the step signal.

Indoor unit controller 704 can be configured to control indoor fan 738. The indoor fan 738 can be configured to blow air over indoor coil 740. In this regard, the indoor unit controller 704 can control the amount of air blowing over the indoor coil 740 by generating control signals to control the speed and/or torque of the indoor fan 738. In some embodiments, the control signals are pulse wave modulated signals (PWM), analog voltage signals (i.e., varying the amplitude of a DC or AC signal), and/or any other type of signal. In one embodiment, the indoor unit controller 704 may receive a signal from the outdoor unit controller indicating one or more operating values, such as speed for the indoor fan 738. In one embodiment, the operating value associated with the indoor fan 738 is an airflow, such as cubic feet per minute (CFM). In one embodiment, the outdoor unit controller 706 may determine the operating value of the indoor fan based on a percentage of a delta between a minimum operating value of the compressor and a maximum operating value of the compressor plus the minimum operating value. In some embodiments, the minimum operating value and the maximum operating value are based on the determined outdoor ambient temperature, and the percentage of the delta is based on a predefined temperature differential multiplier and one or more time dependent multipliers.

The indoor unit controller 704 may be electrically connected (e.g., wired connection, wireless connection, etc.) to pressure sensor 744 and/or temperature sensor 746. In this regard, the indoor unit controller 704 can take pressure and/or temperature sensing measurements via pressure sensor 744 and/or temperature sensor 746. In one embodiment, pressure sensor 744 and temperature sensor 746 are located on the suction line (i.e., a predefined distance from indoor coil 740). In other embodiments, the pressure sensor 744 and/or the temperature sensor 746 may be located on the liquid line (i.e., a predefined distance from indoor coil 740).

Modular Housing for Sensor Devices or Thermostats

Turning now to FIGS. 8-27, several embodiments of a modular housing 800 for an electronic device 801, are shown, according to an example embodiment. In some embodiments, electronic device 801 including modular housing 800 can be a sensor device.

Figure 8:
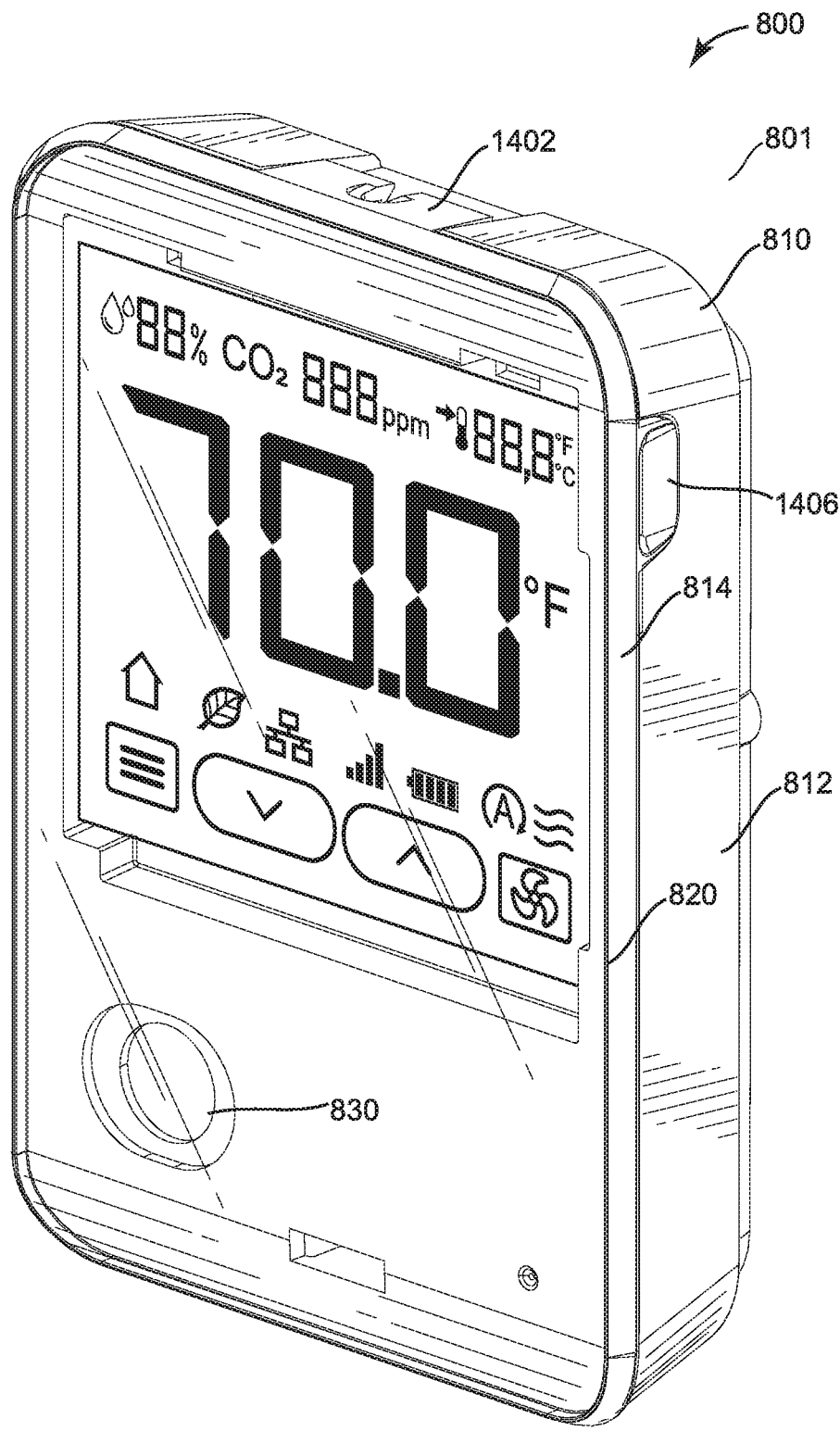
FIG. 8 is a prospective view of a modular housing for an electronic device, according to an example embodiment.

Referring now to FIG. 8, a perspective view of modular housing 800 including electronic device 801 is shown, according to an exemplary embodiment. Modular housing 800 is adapted to perform the functions described in greater detail below. Modular housing 800 may facilitate mounting of electronic device 801 to a vertical wall or surface with one or more mounting features. In some embodiments, modular housing 800 may enclose at least four sensor components. Some traditional sensor housings support enclosure of up to three sensor components. For example, a traditional sensor housing might support a temperature sensor, a humidity sensor, and an occupancy sensor. However, many previous conventional $CO_2$ sensors were too large to be enclosed in the same sensor housing with a temperature sensor, a humidity sensor, and an occupancy sensor and often two separate sensor units, each with its own housing, would need to be used for a room requiring all four sensor inputs. Accordingly, a housing supporting at least four sensor components reduces the need for additional external sensor housings. For example, a housing supporting at least four sensor components can include a temperature sensor, a humidity sensor, an occupancy sensor, and a $CO_2$ sensor. Furthermore, a modular sensor housing may easily accommodate a different number and/or type of sensor components. For example, a modular housing may encapsulate two sensor components or may scale to encapsulate four or more sensor components or combinations of sensor components. In some embodiments, modular housing 800 may be configured to have a low profile. Traditional sensor housings protrude out from a wall an inch or more, increasing the risk of damage to the sensor device. For example, a traditional temperature sensor in a hospital might be damaged by a passing gurney. However, a housing having a low profile reduces the likelihood of damage.

Modular housing 800 can include back portion 810 including back plate 812 and middle plate 814. Modular housing 800 can further include face plate 820. Retention features 1402 and 1406 may mate together back plate 812 and middle plate 814 to form a complete enclosure as described in greater detail with reference to FIGS. 10-11. Modular housing 800 may achieve different configurations by replacing one of back plate 812, middle plate 814, or face plate 820 with a different one of back plate 812, middle plate 814, or faceplate 820. For example, a first blue colored modular housing 800 may be configured to be yellow colored by replacing a blue colored middle plate 814 with a yellow colored middle plate 814 and retaining the original back plate 812 and face plate 820. Modular housing 800 may have various profiles, depths, or sizes depending on components of electronic device 801 enclosed. For example, an electronic device with low profile components may have a low profile housing (i.e., the depth of the housing as measured outward from the wall to which the electronic device is attached) while an electronic device with large components may have a standard housing with a larger depth. Additionally, modular housing 800 may communicably mount to a variety of surfaces. For example, modular housing 800 may be adapted to mount within "standard size electrical junction boxes" (i.e., an electrical junction box of a specific size as set forth an electrical standard setting authority or electric code). Electrical junction boxes come in standard sizes to allow for interoperability of electrical components from different manufactures and to comply with electrical codes applicable to particular jurisdictions. Exemplary standard size electrical junction boxes include a 1-gang junction box as defined by U.S. National Electric Code Chapter 3 Article 314. In some embodiments, modular housing 800 is adapted to perform the functions discussed below by selection of various combinations of back plate 812, middle plate 814, and face plate 820. In some embodiments, modular housing 800 includes window 830 configured to allow a sensor (such as an infrared occupancy sensor) to view the area in front of modular housing 800.

Figure 9:
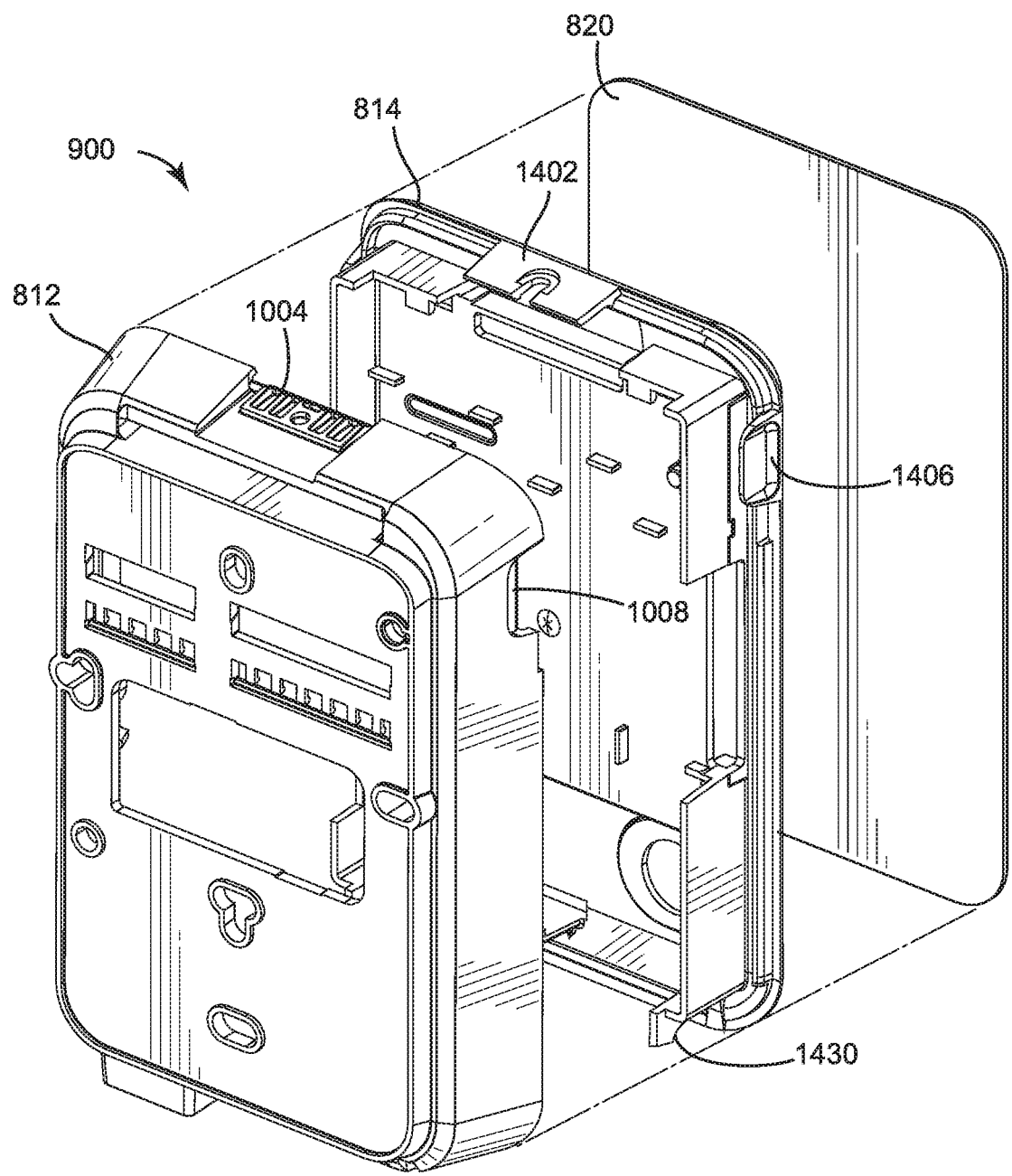
FIG. 9 is an exploded view of the modular housing of FIG. 8, according to an example embodiment.

Referring now to FIG. 9, an exploded view of modular housing 800 is shown, according to an exemplary embodiment. In the illustrated embodiment, modular housing 800 includes back plate 812, middle plate 814, and face plate 820. Back plate 812, middle plate 814, and face plate 820 may be mated together (via retention features 1004, 1402, 1008, 1040, 1406, and/or 1430, for example) to form modular housing 800. In some embodiments, back plate 812, middle plate 814, and/or face plate 820 may be replaced by a different one of back plate 812, middle plate 814, and/or face plate 820 to provide a different device appearance and/or to accommodate a different configuration of electronic device 801.

Figure 10:
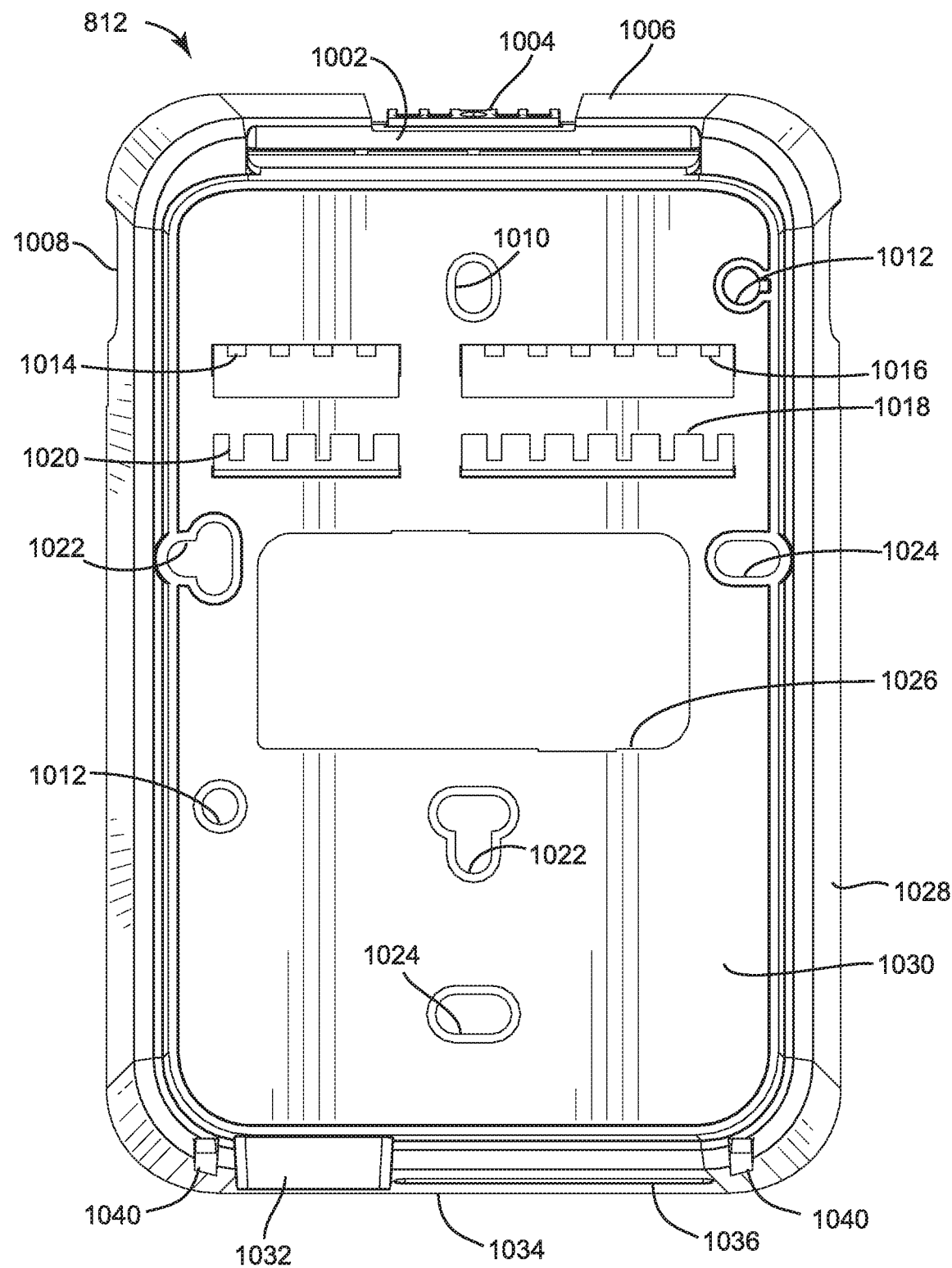
FIG. 10 is a rear elevation view of a back plate of the modular housing of FIG. 8.
Figure 11:
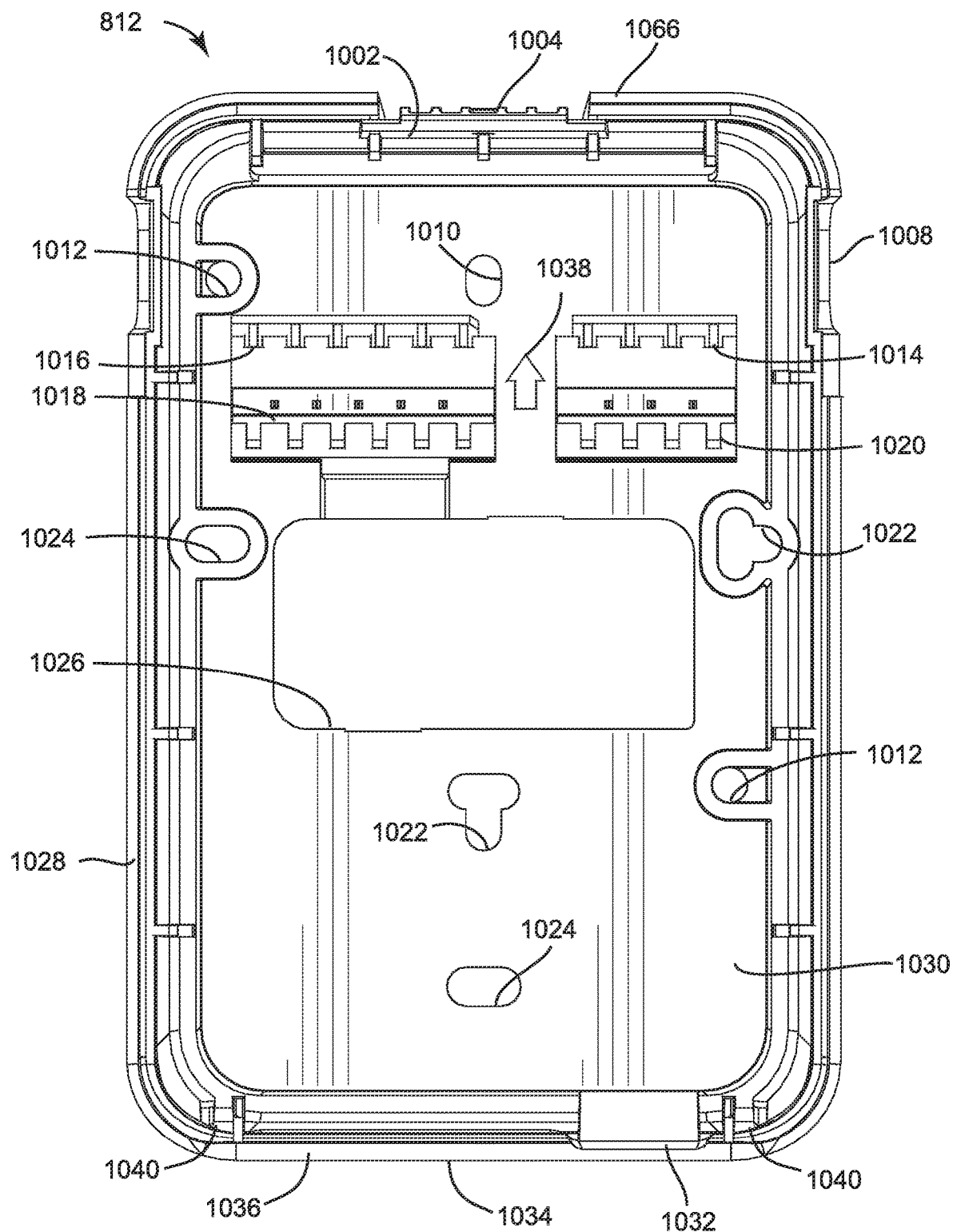
FIG. 11 is front elevation view of a back plate of the modular housing of FIG. 8.

Referring to FIGS. 10-11, additional views of back plate 812 are shown, according to an exemplary embodiment. FIG. 10 depicts an elevation view of the rear of back plate 812. FIG. 11 depicts an elevation view of the front of back plate 812. Back plate 812 includes rear wall 1030, top wall 1006, side walls 1028, and bottom wall 1034. Back plate 812 is open to the front to allow for attachment of middle plate 814.

Rear wall 1030 is shown to include mounting features 1010, 1012, 1022, and 1024. In some embodiments, any number of mounting features 1010, 1012, 1022, and 1024 can be provided to facilitate installation of electronic device 801 to a wall or vertical surface. Mounting features 1010, 1012, 1022, and 1024 can be configured to allow modular housing 800 to be installed on a surface such that rear wall 1030 is flush with the surface. For example, mounting features 1010, 1012, 1022, and 1024 can be oblong holes that receive screws to attach back plate 812 to a wall. Mounting features 1010, 1012, 1022, and 1024 can further be configured to allow modular housing 800 to be mounted to a standard electrical junction box (e.g., a 1-gang junction box as defined by U.S. National Electric Code Chapter 3 Article 314). In some embodiments, different instances of back plate 812 have different or a different combination thereof of mounting features 1010, 1012, 1022, and 1024. For example, a first back plate 812 may have mounting features to mount to a wall while a second back plate 812 may have mounting features to mount within an electrical junction box.

In some embodiments, back plate 812 includes additional features intended to aid in the retention of back plate 812 to middle plate 814, face plate 820, and/or electronic device 801. For example, back plate 812 can include retention features 1004, 1008, and 1040 to contact and/or latch one or more retention features of middle plate 814 or face plate 820 to form a tight-fitting seam. Retention features 1004, 1008, and 1040 may be configured to release contact and decouple back plate 812 from middle plate 814 upon the exertion of a compressive force. In some embodiments, retention features 1004, 1008, and 1040 may be configured to be inaccessible or inoperable to a user such that only a technician or one skilled in repair of electronic device 801 may decouple back plate 812 from middle plate 814. In some embodiments, retention features 1004, 1008, and 1040 may be configured to release contact and decouple back plate 812 from middle plate 814 upon loosening and then depressing a locking screw.

In some embodiments, back plate 812 includes air inlet 1002 and 1036 to permit convection airflow to adequately cool electronic device 801. In some embodiments, electronic device 801 may include a fan or blower to force cooling air through electronic device 801. Air inlet 1002 and 1036 can also be configured at various locations of back plate 812 to facilitate convection airflow. For example, cool air can enter through air inlet 1002, absorb thermal energy generated by components of electronic device 801, and then exit through air outlet 1036, thereby completing the ventilation process. Also, in some embodiments, electronic device 801 may be a thermostat or sensor including one or more sensors for sampling air quality (e.g., air quality sensors, volatile organic compound sensors, etc.) within a controlled space (e.g., the room the electronic device 801 is located in). In these embodiments, the air flow path through back plate 812 not only provides the described cooling function, but also provides the sensor with access to the air so that air quality may be sampled.

Back plate 812 is also shown to include a wiring opening 1026. Wiring opening 1026 allows one or more wires to pass into the interior of electronic device 801. In some embodiments, wiring opening 1026 can be defined by any suitable length and width to facilitate installation and wiring connections. Back plate 812 is also shown to include attachment point 1014-1020. Attachment point 1014-1020 may fasten or communicably mount a fastener or terminal block to secure one or more wires to electronic device 801. Attachment point 1014-1020 can be defined by any suitable length and width to facilitate fastening of one or more wires or wiring connections. In some embodiments, back plate 812 includes port 1032. Port 1032 allows one or more connections to electronic device 801. For example, port 1032 can be used by a technician to connect a diagnostic device to electronic device 801 using a category 5 cable. Port 1032 can be configured at various locations of back plate 812.

Referring now to FIG. 11, an elevation view of the front of back plate 812 is shown, according to an exemplary embodiment. In some embodiments, back plate 812 includes marking 1038 to provide information to a user, installer and/or technician of electronic device 801. For example, marking 1038 can include a directional arrow indicating a reference direction to aid an installer with installation of electronic device 801. Marking 1038 can be configured at various locations of back plate 812.

Figure 12:
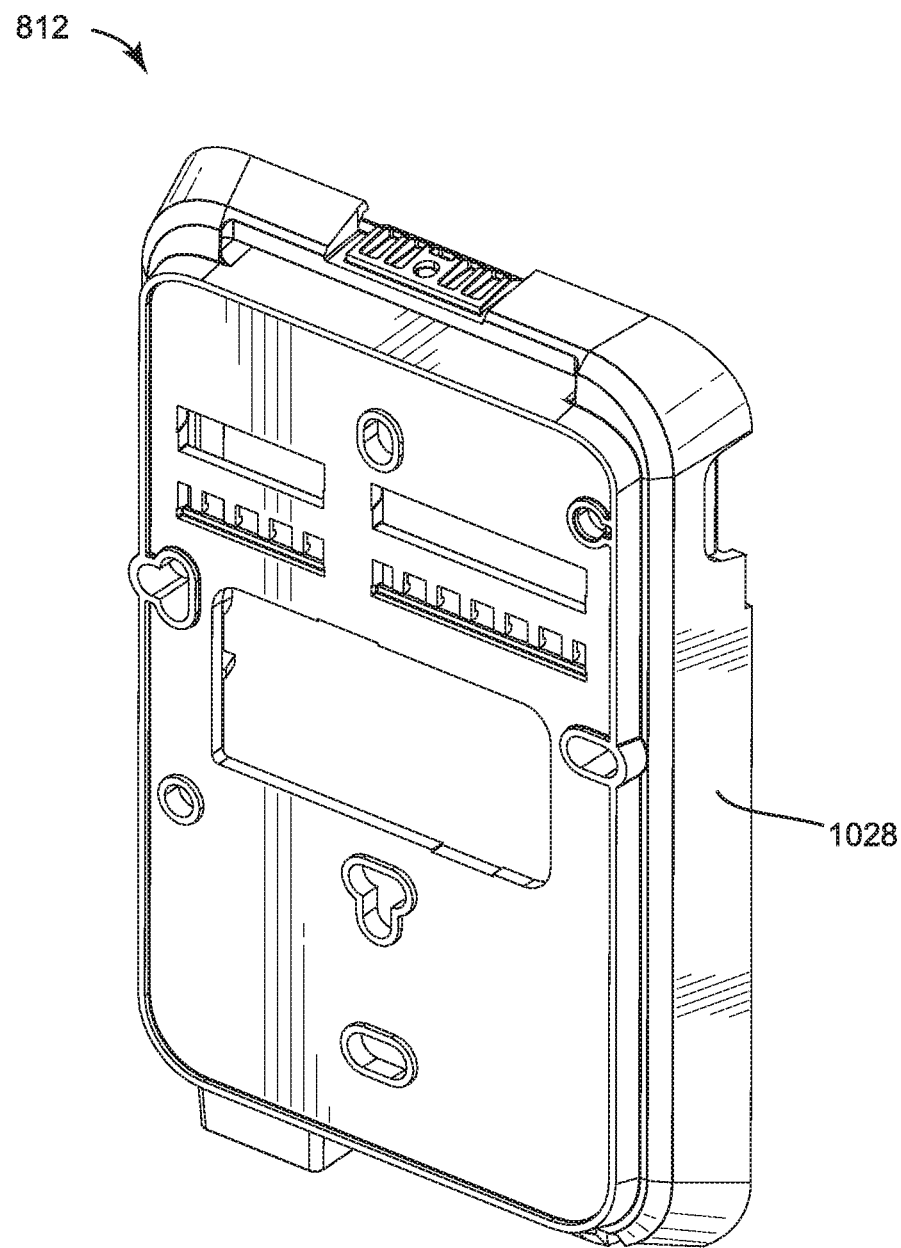
FIG. 12 is a prospective view of the back plate of the modular housing of FIGS. 10-11 including a thinned sidewall.

Referring now to FIG. 12, a prospective view of back plate 812 including a low profile is shown, according to an exemplary embodiment. In some embodiments, different instances of back plate 812 are configured to have different dimensions to accommodate different configurations of electronic device 801. For example, a first back plate 812 may have a low profile defined by a reduced depth of sidewall 1028 while a second back plate 812 may have a standard profile defined by a standard depth of sidewall 1028 that is larger than the reduced dpth of the low profile back plate. In other embodiments, an increased profile third back plate 312 has a larger depth than both the standard depth and the low profile depth versions of the back plate 312. Such larger depth profile may be used to accommodate sensors or other components of sizes large enough to require a larger housing. In some embodiments, modular housing 800 may be integrated with a wall junction box by reducing the depth of sidewall 1028. In a high traffic environment (e.g., a hospital, loading dock, mail room, etc.) a low profile may be desirable to reduce unintended collisions with or damage to modular housing 800. In some embodiments, different back plates 812 are configured to mount with different surfaces. For example, a first back plate could mount to a wall while a second back plate could feature a "bump out" or protrusion configured to fit within and mount to a standard electrical junction box (e.g., a 1-gang junction box as defined by U.S. National Electric Code Chapter 3 Article 314). Accordingly, a sensor device could be adapted to mount within an electrical junction box by replacing the first back plate with the second back plate.

Figure 13:
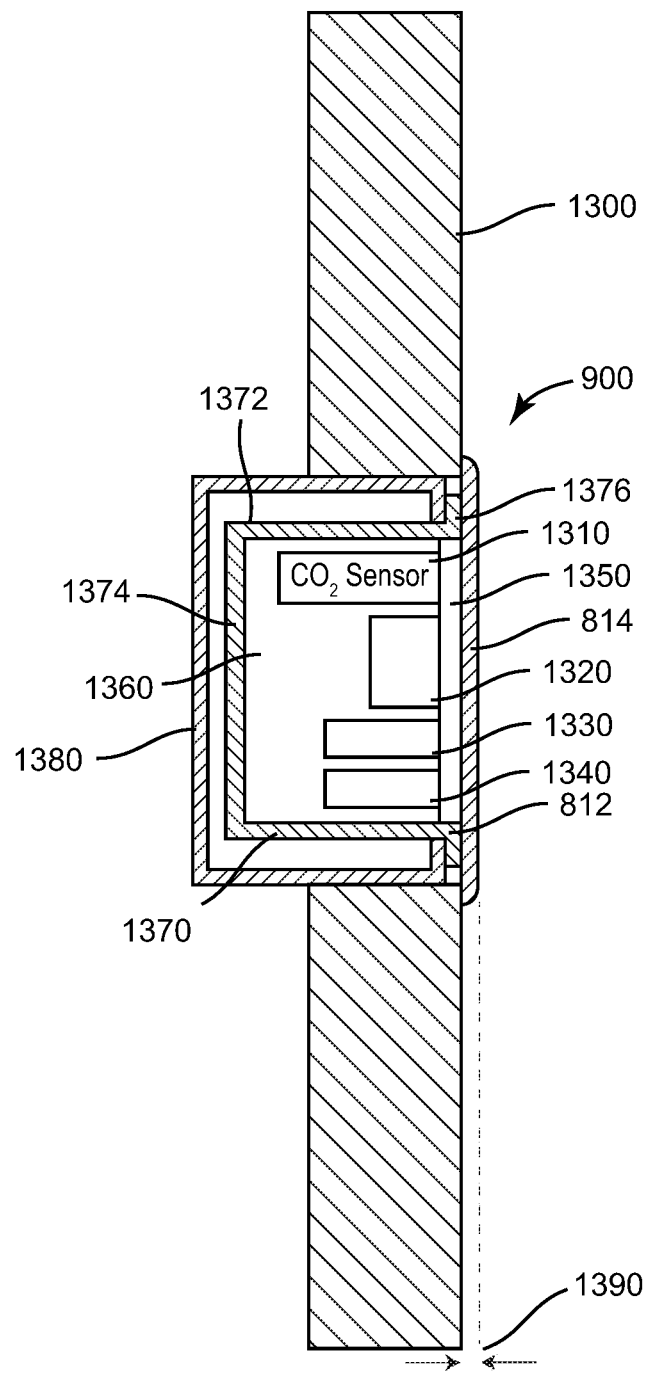
FIG. 13 is a cross-sectional view of the back plate of FIG. 12 mounted in a standard size electrical junction box.

Referring now to FIG. 13, a cross sectional view of modular housing 800 including a back plate 812 adapted to mount within electrical junction box 1380, is shown, according to an exemplary embodiment. In some embodiments, back plate 812 may feature a "bump out" or protrusion 1370 configured to fit within and mount to an electrical junction box 1380. Back plate 812 can include mounting surface 1376 configured to attach to a standard sized electrical junction box (electrical junction box 1380 for example). A front portion (e.g., middle plate 814) may attach to back plate 812 and define an interior housing volume 1350. Protrusion 1370 may include back wall 1374 spaced apart from mounting surface 1376 and connected to mounting surface 1376 by four sidewalls 1372 to form a rectangular prism with one open side. In other embodiments, the protrusion is shaped differently (e.g., a hemisphere). A back plate 812 configured to fit within and mount to electrical junction box 1380 can fit a large number of electrical components and reduce the need for external sensor housings. In some embodiments, back plate 812 can fit a multitude of sensors. For example, a back plate 812 mounted within an electrical junction box 1380 could fit a carbon dioxide sensor 1310, a temperature sensor 1320, a humidity sensor 1330 and/or an occupancy sensor 1340 instead of only three sensor components, as in conventional sensor devices featuring previously large $CO_2$ sensors. In some embodiments, protrusion 1370 defines an interior protrusion volume 1360 configured to allow one or more electrical components (e.g., $CO_2$ sensor 1310, temperature sensor 1320, humidity sensor 1330, occupancy sensor 1340) to extend from interior housing volume 1350 into interior protrusion volume 1360. Additionally, a back plate 812 configured to fit within and mount to an electrical junction box 1380 can obfuscate large components of electronic device 801 (a $CO_2$ sensor 1310 for example) and provide low profile 1390. Low profile 1390 may be desirable to reduce a likelihood of damage to electronic device 801 due to accidental collisions (with a hospital gurney for example).

Middle plate 814 may mount to back plate 812 to provide the appearance that modular housing 800 is mounted flush to a wall 1300. Different sizes and/or looks of electronic device 801 may be achieved by selecting different instances of back plate 812, middle plate 814, and face plate 820 for combination. For example, a first blue colored wall mounted sensor housing may be assembled from a standard back plate, a blue middle plate, and a standard face plate while a second yellow colored electrical junction box mounted sensor may be assembled from an electrical junction box mounted back plate, a yellow middle plate, and a standard face plate.

Figure 13A:
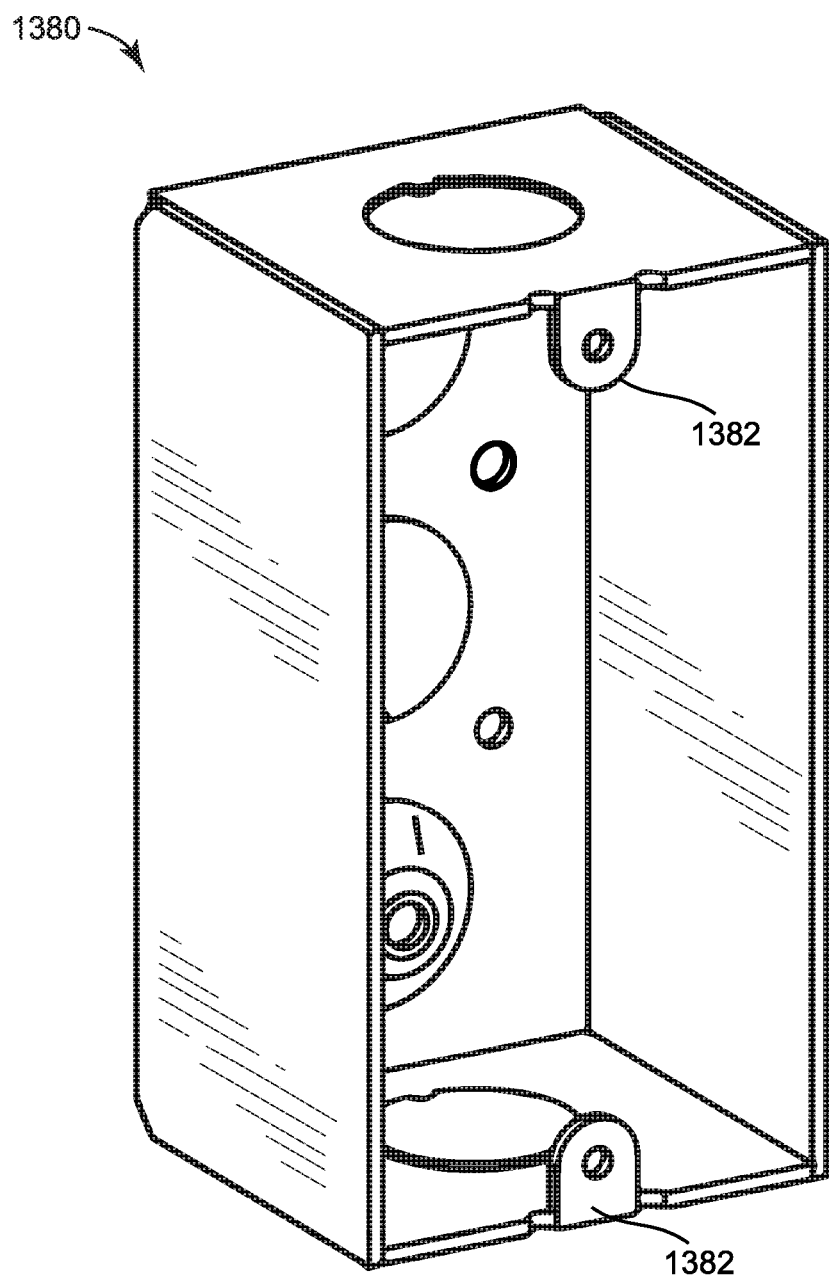
FIG. 13A is a prospective view of the standard size electrical junction box of FIG. 13.

Referring to FIG. 13A, a standard sized electrical junction box 1380 is shown, according to an exemplary embodiment. Back plate 812 may be configured to mount to electrical junction box 1380 as described in detail with reference to FIG. 16. Electrical junction box 1380 may include connection points 1382 to fasten components to electrical junction box 1380. Mounting surface 1376 may be configured to be in the same location as connection points 1382 so that back plate 812 may mount to electrical junction box 1380.

Figure 13B:
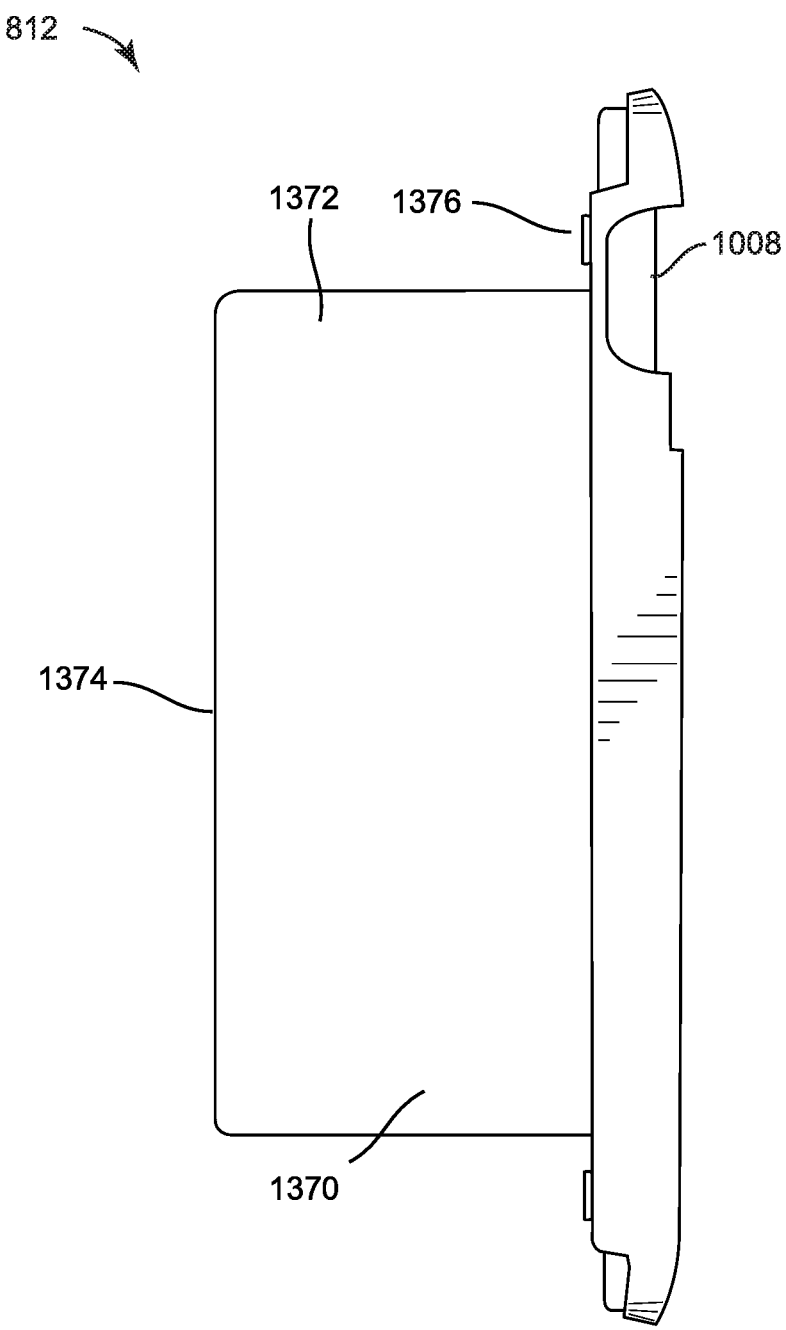
FIG. 13B is a side elevation view of the back plate of FIG. 13.

Referring to FIG. 13B, back plate 812 with protrusion 1370 is shown, according to an exemplary embodiment. Back plate 812 may be configured to mount to electrical junction box 1380 as described in detail with reference to FIG. 13. Protrusion 1370 may include back wall 1374 spaced apart from mounting surface 1376 and connected to mounting surface 1376 by sidewalls 1372. Back plate 812 may mount to electrical junction box 1380 via connection points 1382 and protrusion 1370 may extend into electrical junction box 1380.

Figure 14:
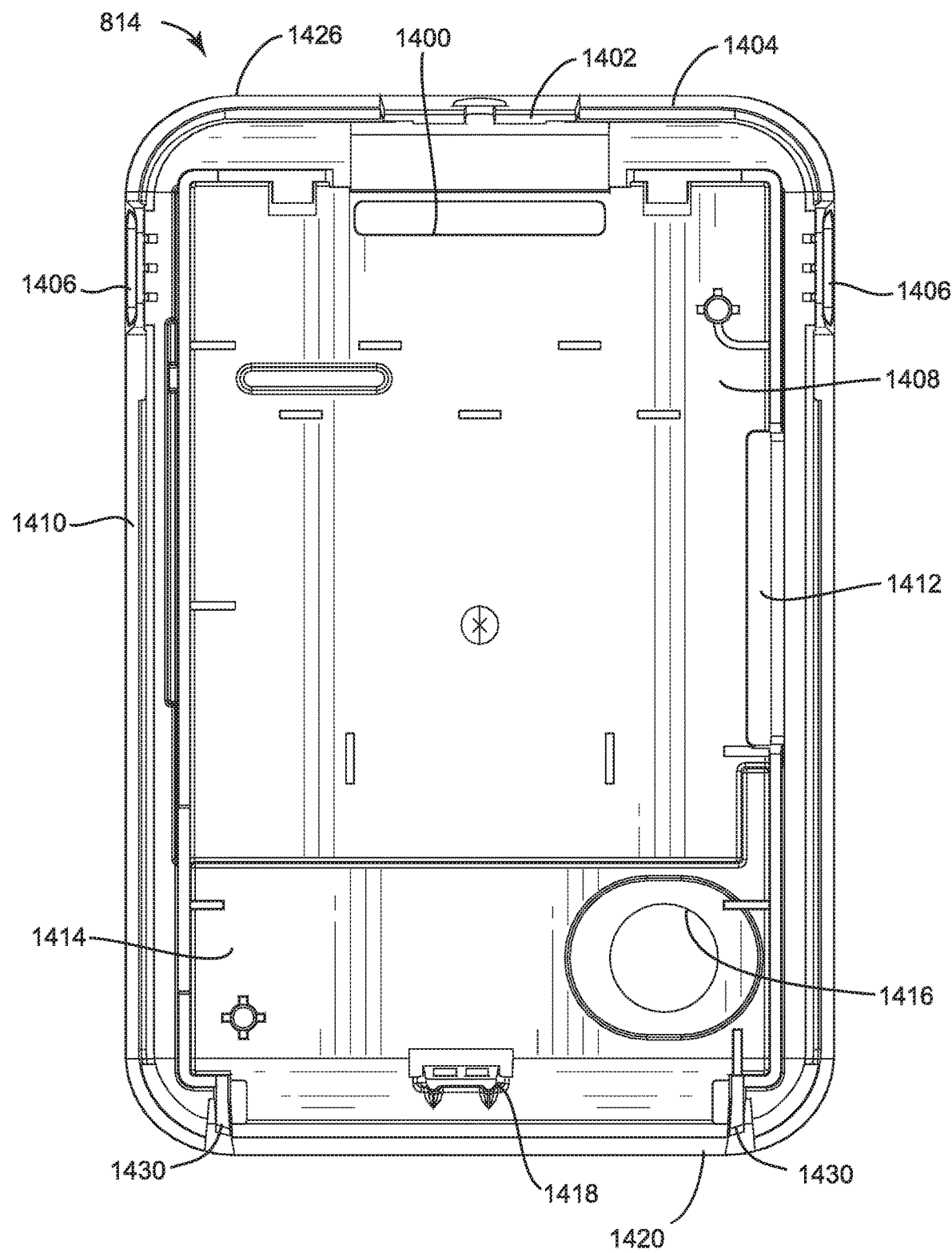
FIG. 14 is a rear elevation view of a bezel of the modular housing of FIG. 8.
Figure 15:
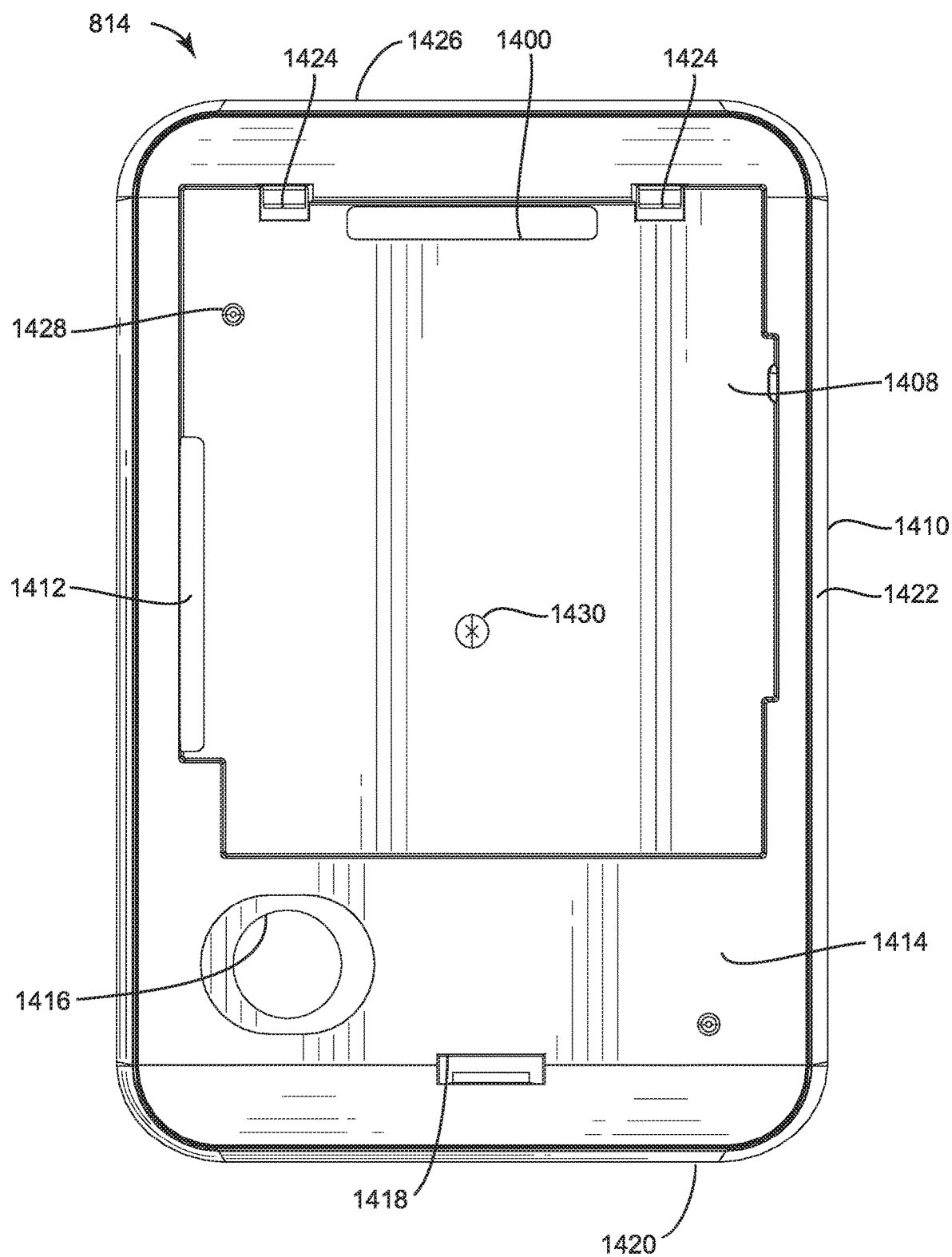
FIG. 15 is a front elevation view of a bezel of the modular housing of FIG. 8.

Turning now to FIGS. 14-15, views of middle plate 814 are shown, according to an exemplary embodiment. FIG. 14 depicts an elevation view of the rear of middle plate 814. FIG. 15 depicts an elevation view of the front of middle plate 814. Middle plate 814 includes rear wall 1408, top wall 1426, side walls 1410, and bottom wall 1420. Middle plate 814 is open to the front to allow for attachment of face plate 820. In some embodiments, middle plate 814 includes second rear wall 1414 configured to be at a different depth than rear wall 1408. In some embodiments, different instances of middle plate 814 have different colors allowing for color customization of modular housing 800 by choosing a specific instance of middle plate 814 having a desired color.

In some embodiments, middle plate 814 includes additional features intended to aid in the retention of middle plate 814 to back plate 812, face plate 820, and/or electronic device 801. For example, middle plate 814 can include retention features 1402, 1406, 1418, and 1430 to contact and/or latch one or more retention features of back plate 812 or face plate 820 to form a tight-fitting seam. Retention features 1402, 1406, 1418, and 1430 may be configured to release contact and decouple middle plate 814 or face plate 820 upon the exertion of a compressive force. In some embodiments, retention features 1402, 1406, 1418, and 1430 may be configured to be inaccessible or inoperable to a user such that only a technician or one skilled in repair of electronic device 801 may decouple middle plate 814 from back plate 812 or face plate 820.

Middle plate 814 is also shown to include window 1416. Window 1416 allows one or more sensors of electronic device 801 to monitor the environment outside of modular housing 800 by proving an opening through middle plate 814. In some embodiments, size of window 1416 can be defined to facilitate installation and function of one or more sensors of electronic device 801. In some embodiments, window 1416 is configured to allow an infrared sensor (for example, an occupancy sensor) to view the area in front of modular housing 800. In some embodiments, window 1416 is configured at different locations of middle plate 814. In some embodiments, window 1416 is the same as window 830. In some embodiments, middle plate 814 includes air inlet 1400 and 1412 as described with reference to FIG. 15.

Referring now to FIG. 15, an elevation view of the front of middle plate 814 is shown, according to an exemplary embodiment. In some embodiments, middle plate 814 includes rear wall 1408 configured to mount a circuit board, display, or other electronic component. In some embodiments, rear wall 1408 mounts various electronic display components discussed in reference to FIGS. 16-27 below. Middle plate 814 can include retention features 1418, 1424, 1428, and 1430. Retention features 1418, 1424, 1428, and 1430 may be configured to contact and/or latch one or more retention features of a circuit board, display, or other electronic component to join the circuit board, display, or other electronic component to middle plate 814. Retention features 1418, 1424, 1428, and 1430 may be configured to release contact and decouple middle plate 814 from the circuit board, display, or other electronic component upon the exertion of a compressive force. In some embodiments, retention features 1418, 1424, 1428, and 1430 may be configured to be inaccessible or inoperable to a user such that only a technician or one skilled in repair of electronic device 801 may decouple middle plate 814 from the circuit board, display, or other electronic component. In some embodiments, a circuit board, display, or other electronic component may adhere to rear wall 1408 via an adhesive or other adhering material.

In some embodiments, middle plate 814 includes bezel 1422. Bezel 1422 may be of various ornamental appearances for different instances of middle plate 814. For example, a first middle plate 814 may have a first bezel 1422 of a chrome silver finish and a second middle plate 814 may have a second bezel 1422 of a matte black finish. In some embodiments, middle plate 814 is configured to change the appearance of modular housing 800. For example, a first middle plate 814 may have a chrome silver finish, providing a first modular housing 800 with a chrome silver appearance while a second middle plate 814 having a matte black finish may replace the first middle plate 814 providing the first modular housing 800 with a matte black appearance.

In some embodiments, middle plate 814 includes air inlet 1400 and 1412 to permit the convection airflow necessary to adequately cool a circuit board, display, or other electronic component attached to middle plate 814. Air inlet 1400 and 1412 can also be configured at various locations of middle plate 814 to facilitate convection airflow. For example, cool air can enter through air inlet 1400, dissipate thermal energy generated by a circuit board, display, or other electronic component, and then exit through air inlet 1412, thereby completing the ventilation process. Air inlet 1400 and 1412 may also allow airflow through modular housing 800 such that components of electronic device 801 may sample the airflow. In some embodiments, air inlet 1412 can allow a cable to connect between a circuit board, display, or other electronic component located on the back of middle plate 814 and a circuit board, display, or other electronic component located on the front of middle plate 814.

Figure 17:
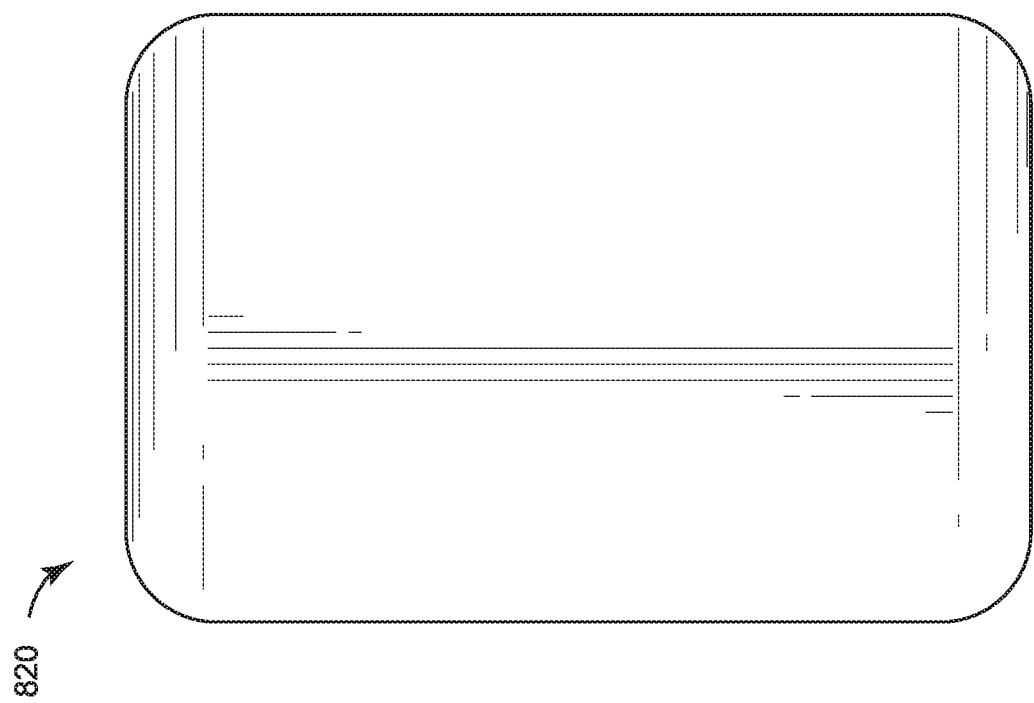
FIG. 17 is a front elevation view of a face plate of the modular housing of FIG. 8.
Figure 16:
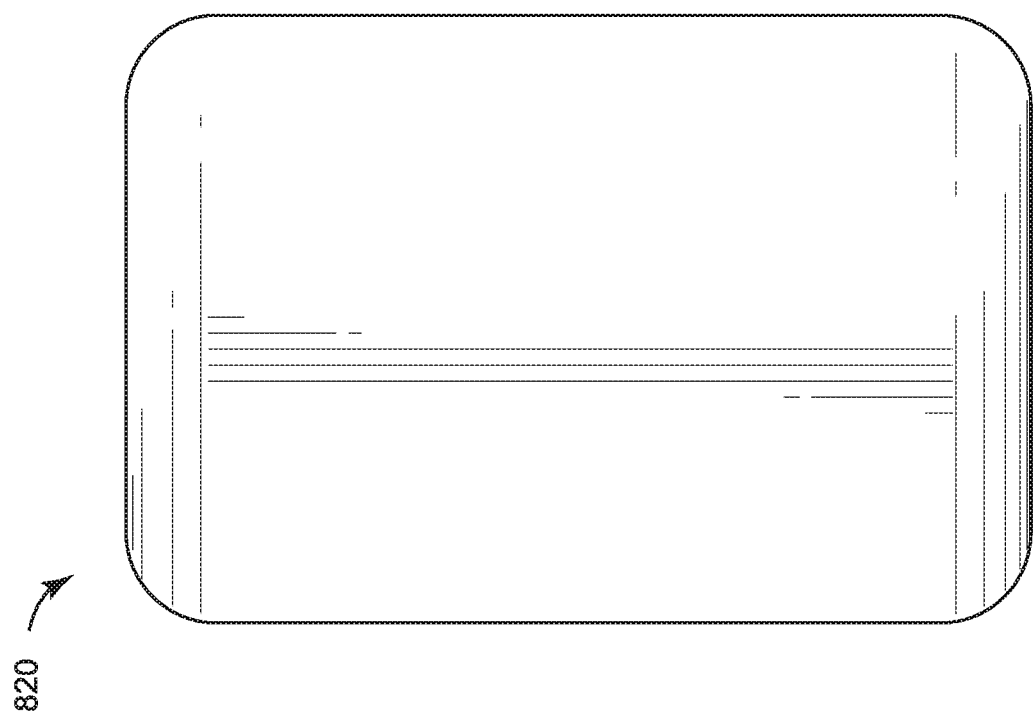
FIG. 16 is a rear elevation view of a face plate of the modular housing of FIG. 8.

Turning now to FIGS. 16-17, views of face plate 820 are shown, according to an exemplary embodiment. FIG. 16 depicts an elevation view of the rear of face plate 820. FIG. 17 depicts an elevation view of the front of face plate 820. Face plate 820 can be configured to attach to middle plate 814 through retention features (e.g., retention features 1418, 1424, 1428, and 1430). In some embodiments, face plate 820 can adhere to middle plate 814 via an adhesive or other adhering material. In some embodiments, face plate 820 is made of transparent acrylic plastic or another clear material and allows a view of components behind face plate 820 (e.g., middle plate 814). In some embodiments, graphics are applied to the back surface of face plate 820 and are visible from the front surface of face plate 820. Face plate 820 may be ornamentally modified to provide a number of display appearances for electronic device 801. By way of example, a brand logo may be applied to the back of face plate 820 and remain viewable through the front surface of face plate 820. A graphic applied to the back of face plate 820 reduces the risk that the graphic could be scratched or otherwise damaged.

Turning now to FIGS. 18-27, various embodiments of face plate 820 are shown. The various graphics of FIGS. 18-27 may be applied to face plate 820 in the manner described above in reference to FIGS. 16-17 or any other manner known in the art. In some embodiments, various configurations of modular housing 800 may be achieved by changing middle plate 814 and/or changing face plate 820 for a different instance of face plate 820 having different graphics applied. The various graphics of FIGS. 18-27 may be applied to different instances of face plate 820 to complement different instances of displays integrated with different instances of electronic device 801. For example, a first electronic device 801 configured with an occupancy override display may use a first face plate 820 with applied occupancy override graphics while a second electronic device 801 configured with a digital display may use a second face plate 820 with applied digital display graphics. In some embodiments, modular housing 800 may be customized to have different appearances and functions through selection of different instances of back plate 812, middle plate 814, and/or face plate 820. For example, a low profile, chrome silver colored electronic device 801 with an occupancy override display could be assembled from a low profile back plate, a chrome silver colored middle plate, and a face plate with occupancy override applied graphics.

Figure 18:
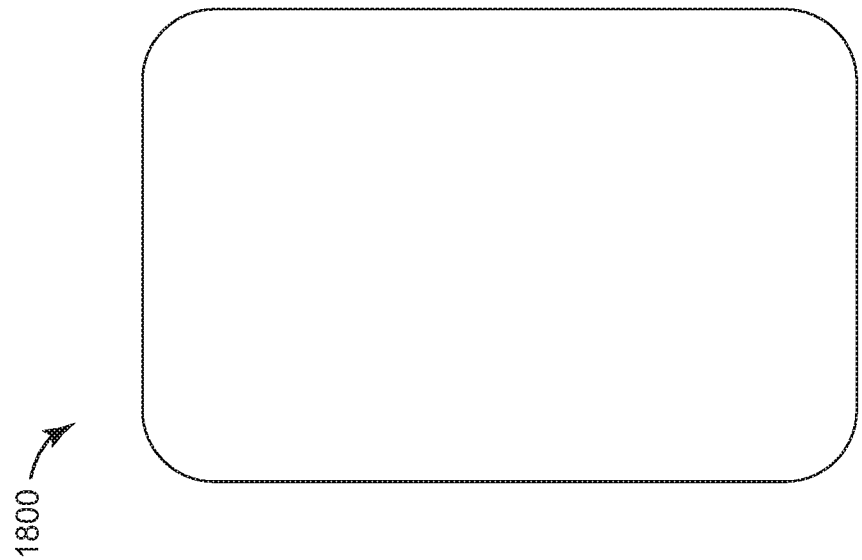
FIG. 18 is a display of the modular housing of FIG. 8, according to an example embodiment.

Referring now to FIG. 18, a minimal display 1800 of face plate 820 is shown, according to an exemplary embodiment. Minimal display 1800 may be used to configure modular housing 800 as a "headless" model without a display or user interface. For example, modular housing 800 housing may be a sensor device without a user interface and may include minimal display 1800. In some embodiments, minimal display 1800 includes sensor window 2100, as shown in FIG. 21. Sensor window 2100 may be configured in the same position as window 1416 of middle plate 814 of modular housing 800. Sensor window 2100 may be a transparent section of face plate 820 such that a sensor component (e.g., an infrared occupancy sensor) may view the area in front of modular housing 800. In some embodiments, minimal display 1800 may be used with a sensor device configured to have no display.

Figure 19:
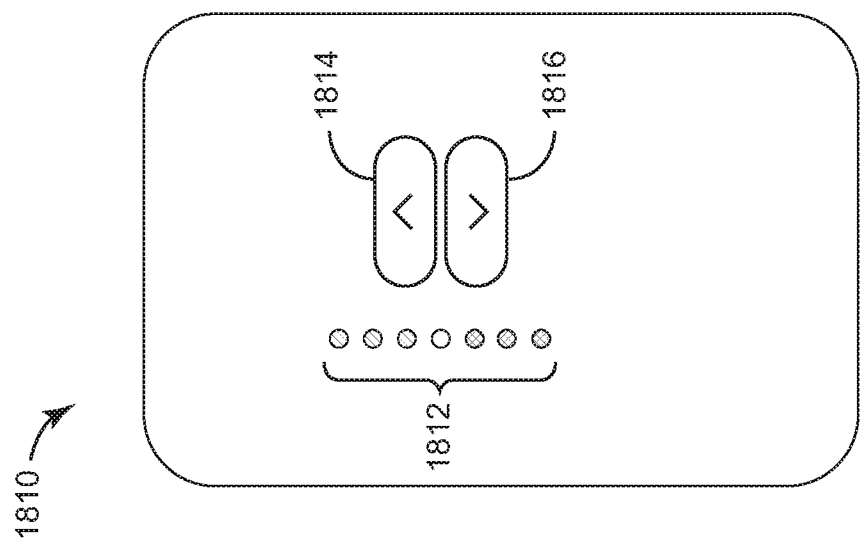
FIG. 19 is the display of FIG. 18 including a set-point element, according to an example embodiment.
Figure 22B:
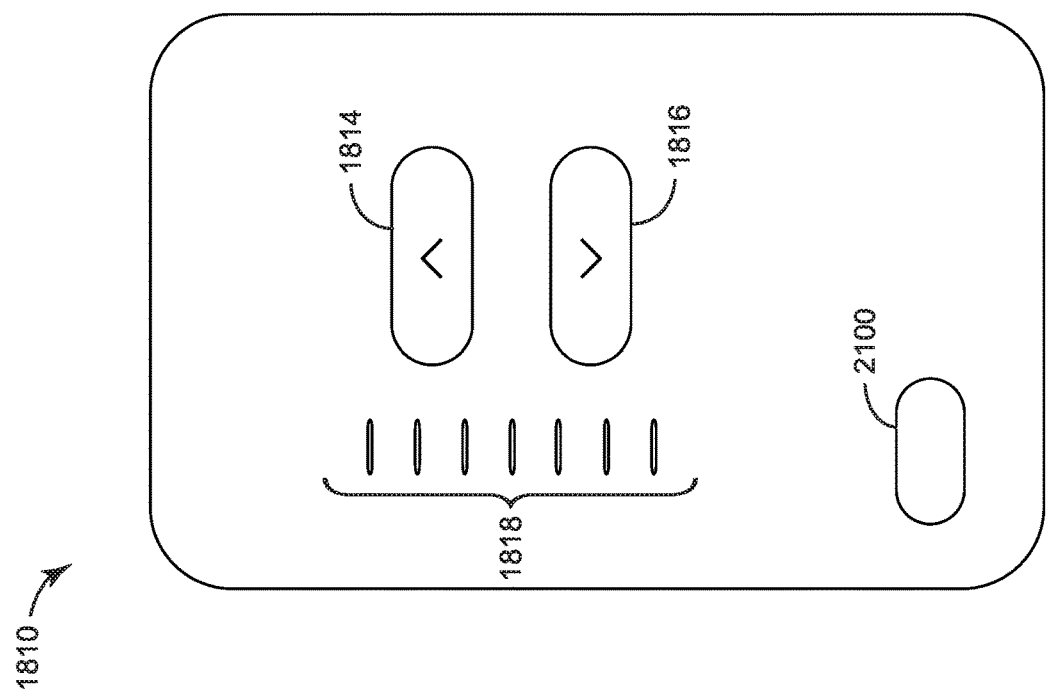
FIG. 22B is the display of FIG. 22 including rectangular indicator lights, according to an example embodiment.

Referring now to FIG. 19, a set-point display 1810 of face plate 820 is shown, according to an exemplary embodiment. Set-point display 1810 may include graphics 1812-1816. Graphics 1812-1816 may be applied to the back side of face plate 820. Graphics 1812-1816 may include display accents and/or button accents to complement a display and/or user interface integrated with middle plate 814. In some embodiments, set-point display 1810 includes sensor window 2100, as shown in FIG. 22. Sensor window 2100 may be configured in the same position as window 1416 of middle plate 814 of modular housing 800. Sensor window 2100 may be a transparent section of face plate 820 such that a sensor component (e.g., an infrared occupancy sensor) may view the area in front of modular housing 800. In some embodiments, set-point display 1810 may be used with a sensor device configured to have a set point display. For example, the set-point display may allow a user to interact with electronic device 801 to monitor and/or change the HVAC temperature set-point for a space. Graphics 1812-1816 may be of another appearance or layout. For example, graphic 1816 may be located to the right of graphics 1814-1816. In some embodiments, set-point display 1810 includes a different appearance or layout of graphics 1812-1816 such as rectangular graphics 1818, as shown in FIG. 22A and FIG. 22B.

Figure 20:
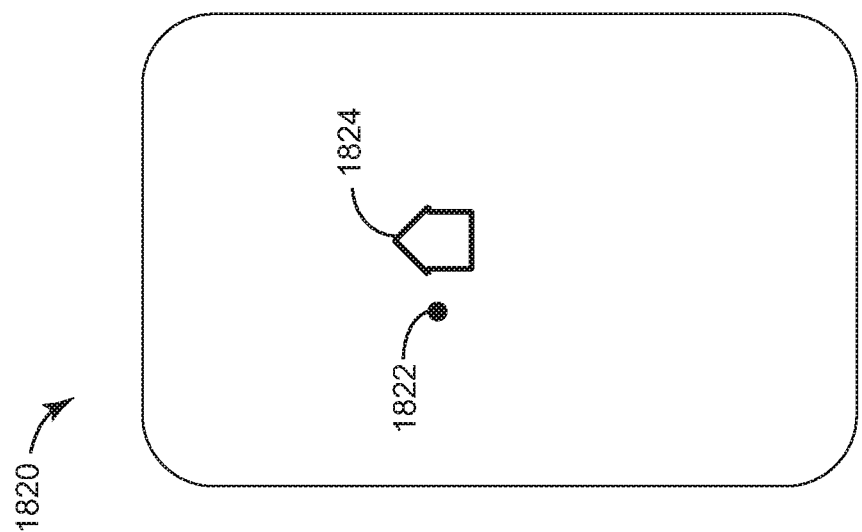
FIG. 20 is the display of FIG. 18 including an occupancy element, according to an example embodiment.
Figure 23:
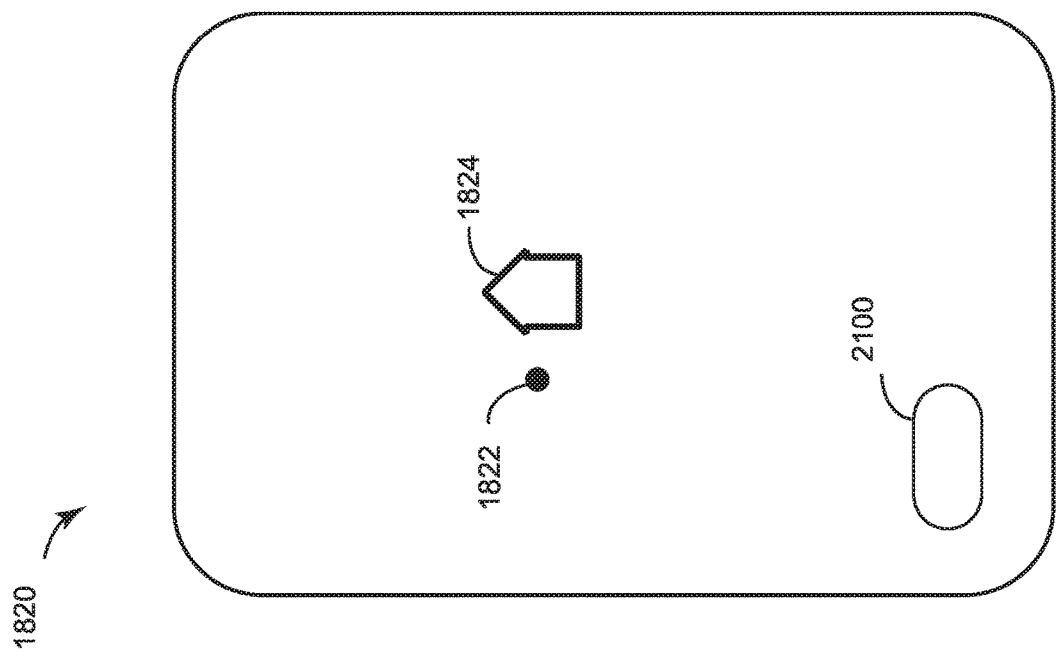
FIG. 23 is the display of FIG. 20 including an opening, according to an example embodiment.

Referring now to FIG. 20, an occupancy display 1820 of face plate 820 is shown, according to an exemplary embodiment. Occupancy display 1820 may include graphics 1822-1824. Graphics 1822-1824 may be applied to the back side of face plate 820. In some embodiments, occupancy display 1820 includes accents to complement a display and/or user interface integrated with middle plate 814. For example, graphics 1822-1824 could be an image of a house and a circular outline indicating occupancy. In some embodiments, occupancy display 1820 includes sensor window 2100, as shown in FIG. 23. Sensor window 2100 may be configured in the same position as window 1416 of middle plate 814 of modular housing 800. Sensor window 2100 may be a transparent section of face plate 820 such that a sensor component (e.g., an infrared occupancy sensor) may view the area in front of modular housing 800. In some embodiments, occupancy display 1820 may be used with a sensor device configured to have an occupancy override display to selectively mark a space as occupied or unoccupied for an HVAC system. For example, a user could interact with a button of electronic device 801 indicated by a graphic 1824 applied to face plate 820 to indicate a room is occupied and initiate heating of the room by a HVAC system.

Referring now to FIG. 24, first display 1830 is shown, according to an exemplary embodiment. In some embodiments, first display 1830 is provided by segment display 2400 integrated with middle plate 814 or face plate 820 and visible through face plate 820. In some embodiments, graphics augmenting segment display 2400 are applied to the back face of face plate 820 to be viewable from the front face of face plate 820. For example, a border for segment display 2400 may be applied to face plate 820 to outline segment display 2400. In some embodiments, first display 1830 includes sensor window 2100, as shown in FIG. 25. Sensor window 2100 may be configured in the same position as window 1416 of middle plate 814 of modular housing 800. Sensor window 2100 may be a transparent section of face plate 820 such that a sensor component (e.g., an infrared occupancy sensor) may view the area in front of modular housing 800. In some embodiments, first display 1830 may be used with a sensor device configured to have a segment display to allow for a user to monitor and change settings of an HVAC system. For example, an electronic device 801 including a segment display could act as a local thermostat for an HVAC system and allow a user to monitor and adjust environmental conditions within a room.

Referring now to FIG. 26, second display 1840 is shown, according to an exemplary embodiment. In some embodiments, second display 1840 is provided by digital display 2600 integrated with middle plate 814 or face plate 820 and visible through face plate 820. In some embodiments, graphics of digital display 2600 are applied to the back face of face plate 820 to be viewable from the front face of face plate 820. For example, a border for digital display 2600 may be applied to face plate 820 to outline sensor window 2100. In some embodiments, second display 1840 includes sensor window 2100, as shown in FIG. 27. Sensor window 2100 may be configured in the same position as window 1416 of middle plate 814 of modular housing 800. Sensor window 2100 may be a transparent section of face plate 820 such that a sensor component (e.g., an infrared occupancy sensor) may view the area in front of modular housing 800. In some embodiments, second display 1840 may be used with a sensor device configured to have a digital display to allow for a user to monitor and change settings of an HVAC system. For example, an electronic device 801 including a digital display could act as a local thermostat for an HVAC system and allow a user to monitor and adjust environmental conditions within a room.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A sensor device, comprising:
a housing comprising:
   a back plate including a mounting surface and a protrusion extending away from the mounting surface, wherein the mounting surface is configured to attach to a standard sized electrical junction box and the protrusion is sized to fit within a standard size electrical junction box, and wherein the protrusion defines an interior protrusion volume;
   a middle plate attached to the back plate; and
   a face plate attached to the middle plate, wherein the face plate is formed from a clear material and has a back surface and a front surface with the back surface positioned toward the middle plate and wherein a design associated with a function of the sensor device is applied to the back surface of the face plate and is visible through the front surface of the face plate;
   wherein the housing defines an interior housing volume; and
   a plurality of sensors comprising a temperature sensor, an occupancy sensor, a humidity sensor, and a carbon dioxide sensor positioned within the interior housing volume;
   wherein the carbon dioxide sensor extends from the interior housing volume into the interior protrusion volume.

2. The sensor device of claim 1, wherein the back plate is selected from a group of back plates including a first back plate having a first depth and a second back plate having a second depth that is greater than the first depth.

3. The sensor device of claim 1, wherein the protrusion comprises a back wall spaced apart from the mounting surface and four sidewalls connecting the back wall to the mounting surface.

4. The sensor device of claim 1, wherein the face plate is selected from a group of face plates including a first face plate having a first design and a second face plate having a second design that is different than the first design.

* * * * *